United States Patent [19]

Kameoka et al.

[11] 3,864,516

[45] Feb. 4, 1975

[54] FOUR-CHANNEL STEREOPHONIC SOUND REPRODUCING SYSTEM

[75] Inventors: Akio Kameoka, Kawasaki; Mamoru Kuriyagawa, Kamakura; Shinichi Nakamura, Tokyo, all of Japan

[73] Assignee: Tokyo Shibaura Electric Co., Ltd., Kawasaki-shi, Japan

[22] Filed: Mar. 7, 1973

[21] Appl. No.: 338,938

[30] Foreign Application Priority Data

Mar. 7, 1972 Japan .............................. 47-22747

[52] U.S. Cl. .. 179/1 GQ, 179/100.4 ST, 179/15 BT
[51] Int. Cl. ............................................ H04r 5/00
[58] Field of Search ........ 179/1 G, 1 GQ, 100.4 ST, 179/100.1 TD, 15 BT

[56] References Cited

UNITED STATES PATENTS 3,708,631 1/1973 Bauer .............................. 179/1 GQ
3,718,773 2/1973 Berkovitz ......................... 179/15 BT

OTHER PUBLICATIONS

Discrete-Matrix Multichannel Stereo by Cooper Journal AES, 6/72, presented 10/7/71.

*Primary Examiner*—Kathleen H. Claffy
*Assistant Examiner*—Tommy P. Chin
*Attorney, Agent, or Firm*—Flynn & Frishauf, P.C.

[57] ABSTRACT

In a four-channel stereophonic sound reproducing system, there are provided a decoder matrix circuit connected to receive composite two channel signals containing four-channel original signals, for producing four-channel reproduced signals, means for producing a sum of the signals of two adjacent channels among the outputs from the decoder matrix circuit, means for comparing the levels of the outputs from the sum producing means and means for attenuating to a zero the level of the reproduced signals of adjacent channels carrying low level signals in accordance with the output of the comparator means.

7 Claims, 16 Drawing Figures

FOUR-CHANNEL STEREOPHONIC SOUND REPRODUCING SYSTEM

This invention relates to a four-channel stereophonic sound reproducing system and more particularly to an improved four-channel stereophonic sound reproducing system capable of effectively preventing undesirable cross-talk between channels during sound reproduction.

A four-channel stereophonic sound reproducing system wherein the original information in four channels produced by using four discrete microphones, for example, are converted into two-channel composite signals by means of an encoder and the resulting two-channel composite signals are applied to a decoder matrix circuit through a two-channel signal transmission circuit designed for this purpose, for example a phonograph record, a magnetic tape, or a broadcasting channel for producing four-channel reproduced information is generally termed as a "4-2-4" system. With such "4-2-4" system it is generally impossible to perfectly reproduce the four-channel original information and cross-talk between adjacent channels is unavoidable. The quantity and characteristic of the cross-talk varies dependent upon the types of the encoder and decoder and there have been proposed a number of types of four-channel stereophonic sound reproducing systems.

When a cross-talk occurs, the separation between channels becomes insufficient so that it is impossible to obtain satisfactory reproduction of the four-channel stereophonic system. In a four-channel stereophonic sound reproducing system, the original information is not always present on all four channels, and usually it is present on only two channels. For example, in the case of music recorded in a music hall, during playing, the sound level is higher in the forward region of the listeners whereas in the rearward region, the sound level is not so high because the sound is composed mainly of echoes. On the other hand when the performance is over, the sound level becomes higher in the rearward region due to clapping of hands. In this manner, the four channel stereophonic sound reproducing systems are often used under conditions wherein forward or rearward two channels alone are operated at higher levels.

It is an object of this invention to provide an improved four-channel stereophonic sound reproducing system wherein the cross-talk between adjacent channels is eliminated when the sound level of at least one channel, more particularly two channels is higher than the remaining channels, thereby enabling reproduction of the sound with satisfactory channel separation.

Another object of this invention is to provide an improved four-channel stereophonic sound reproducing system capable of eliminating cross-talk between adjacent channels and compensating for the decrease in the acoustic output energy caused by the elimination of the cross-talk of leakage of the signal, thereby assuring high quality of the reproduced four-channel stereophonic signals.

SUMMARY OF THE INVENTION

According to this invention, these and other objects can be accomplished by providing a four-channel stereophonic sound reproducing system comprising a decoder matrix circuit connected to receive composite two-channel signals which are transmitted over a two-channel signal transmission circuit and containing the four-channel original signals for producing four-channel reproduced signals, means for producing a sum of the signal levels of two adjacent channel signals among the output signals produced by the decoder matrix circuit, means for comparing the output levels of the sum producing means, and means responsive to the output from the comparing means for attenuating the level of a channel containing cross-talk among the reproduced four-channel signals produced by the decoder matrix circuit.

Further objects and advantages of the invention can be more fully understood from the following detailed description taken in conjunction with the accompanying drawing, in which.

Figure 7A:
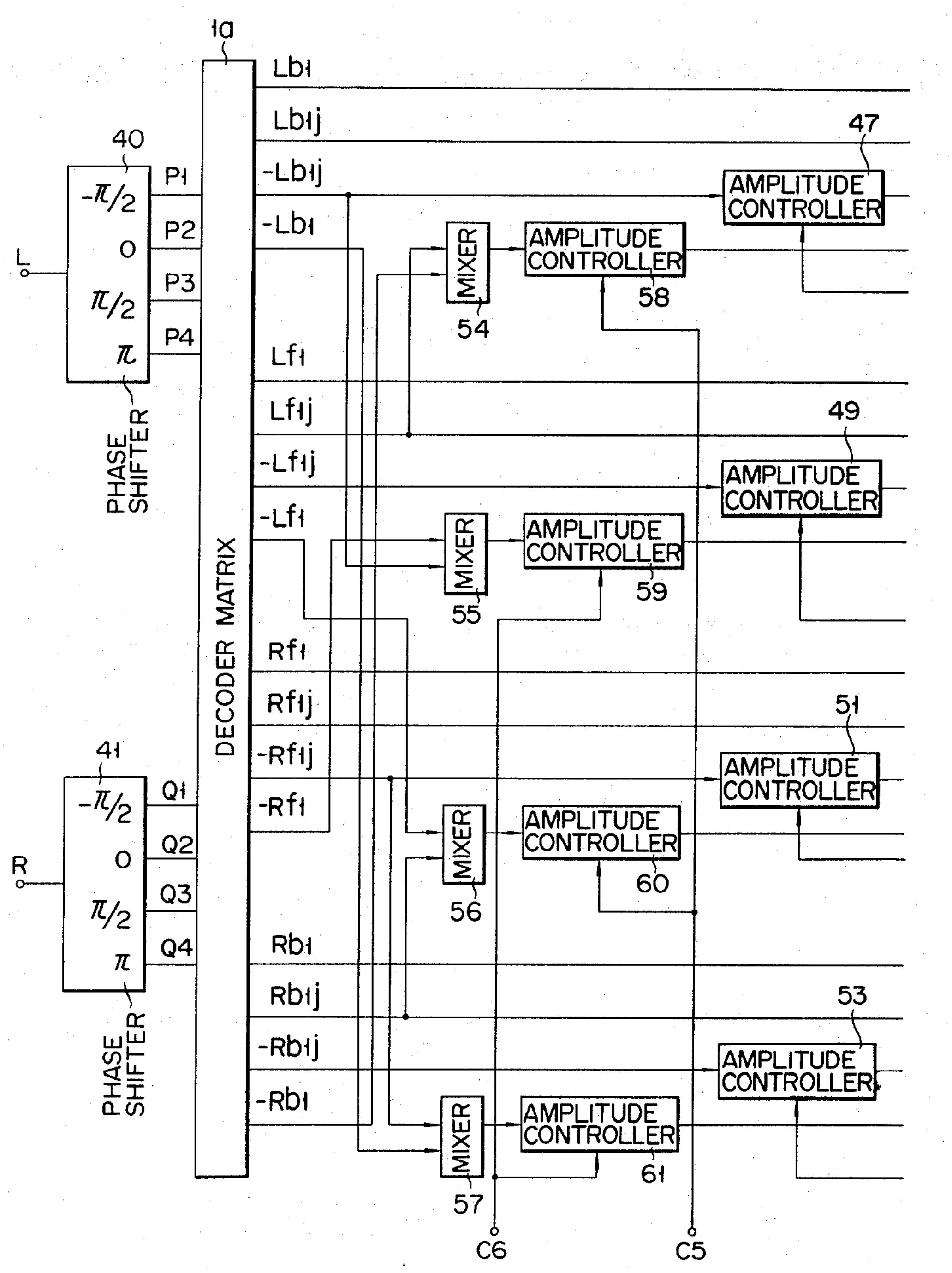
Figure 7B:
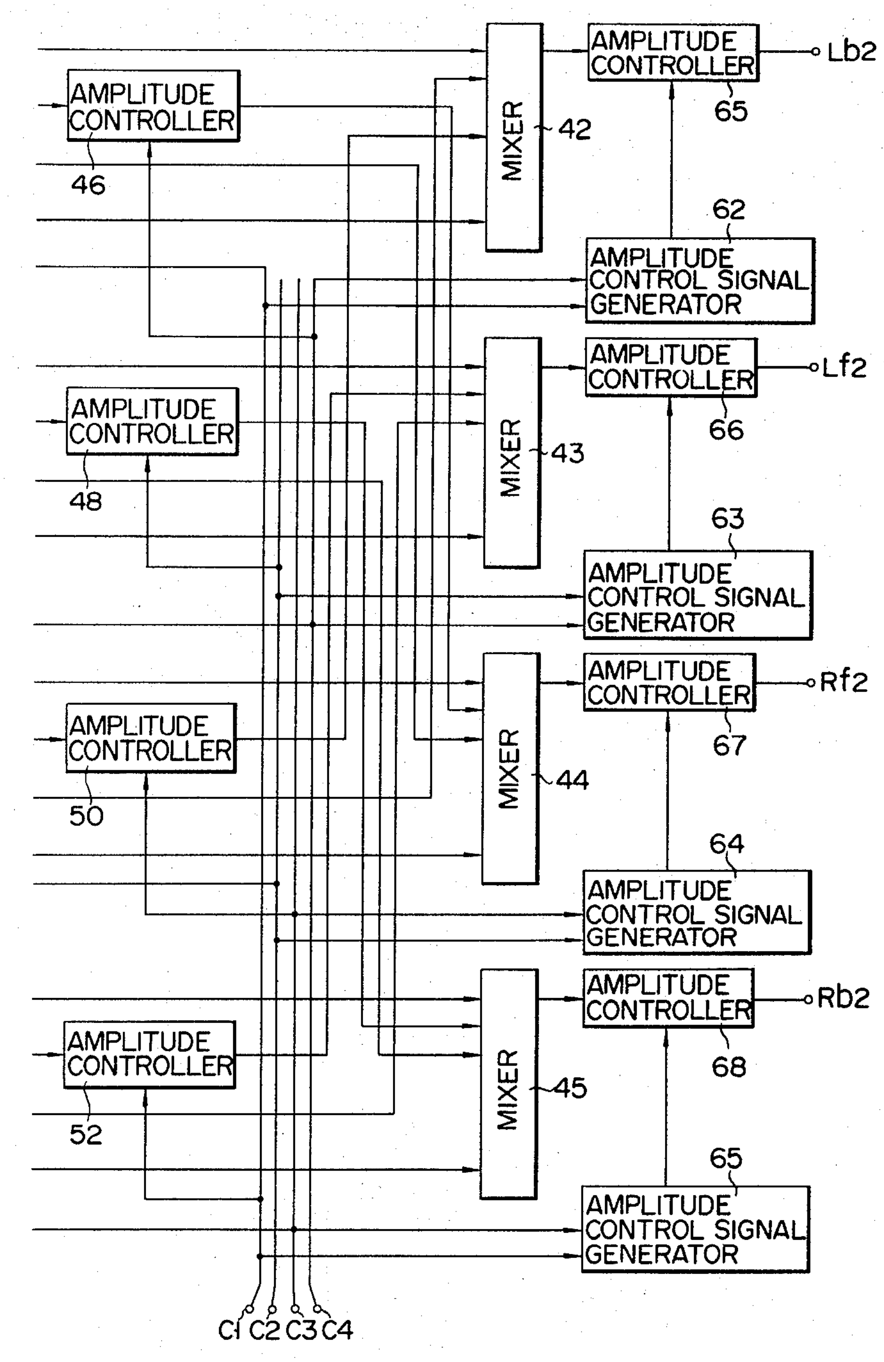
Figure 8:
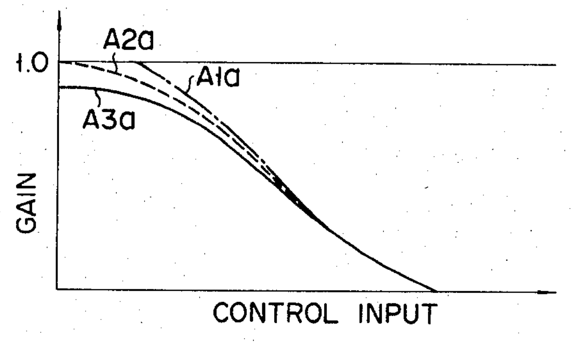
Figure 9:
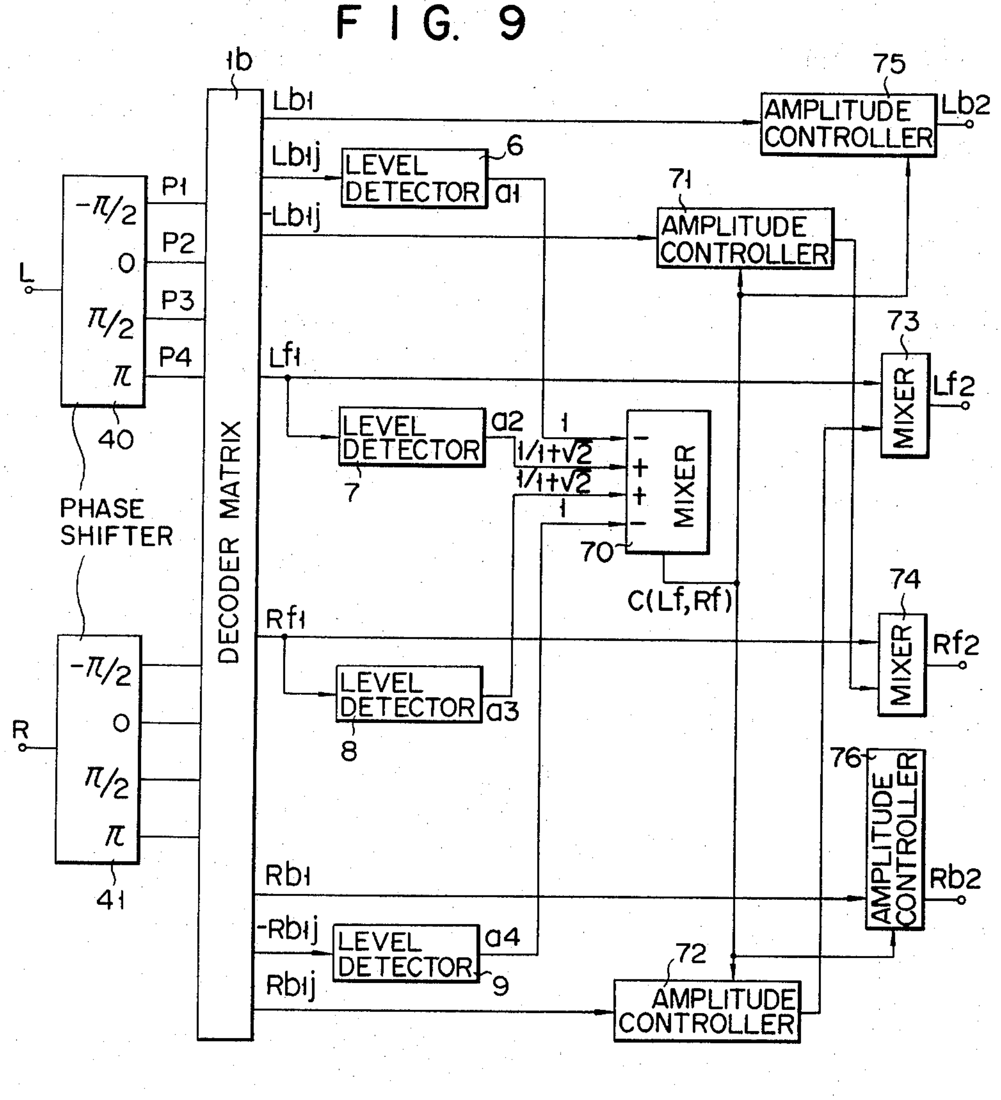
Figure 10:
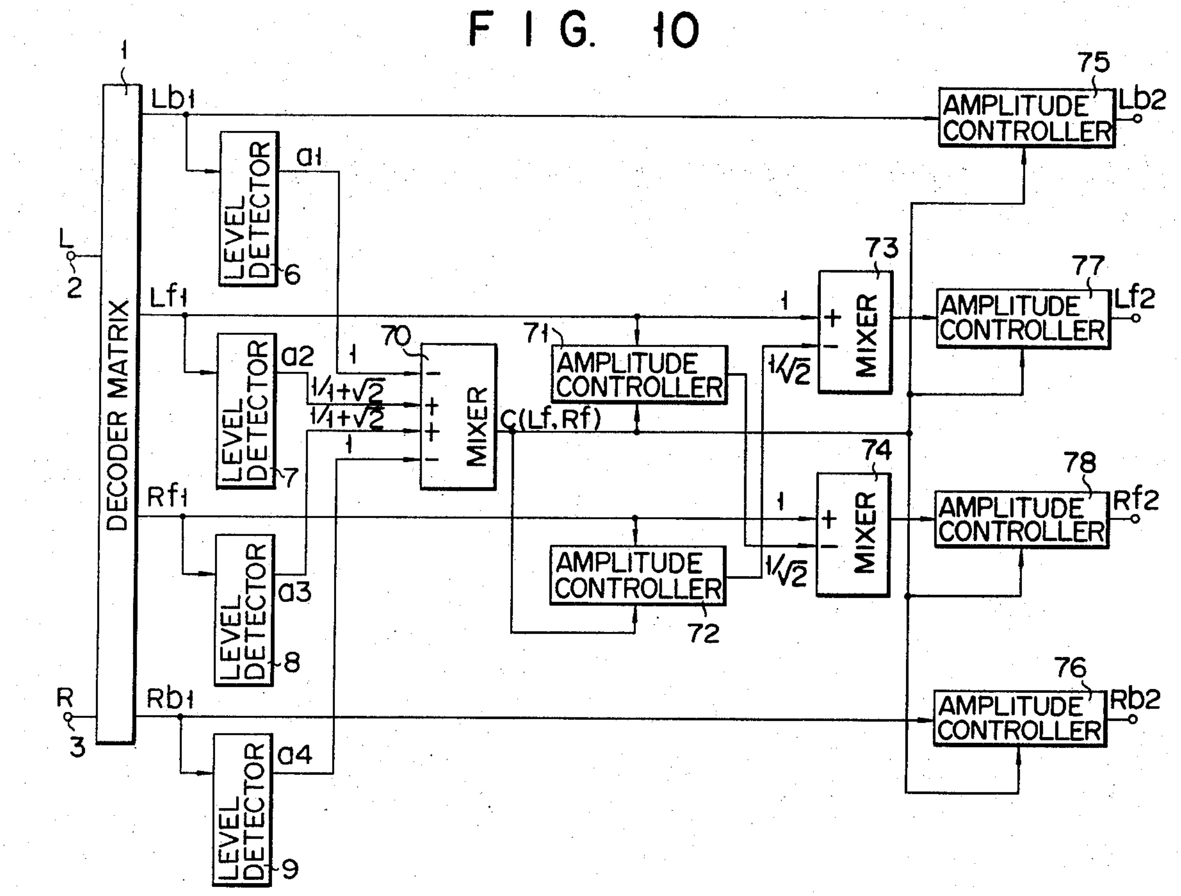
Figure 11:
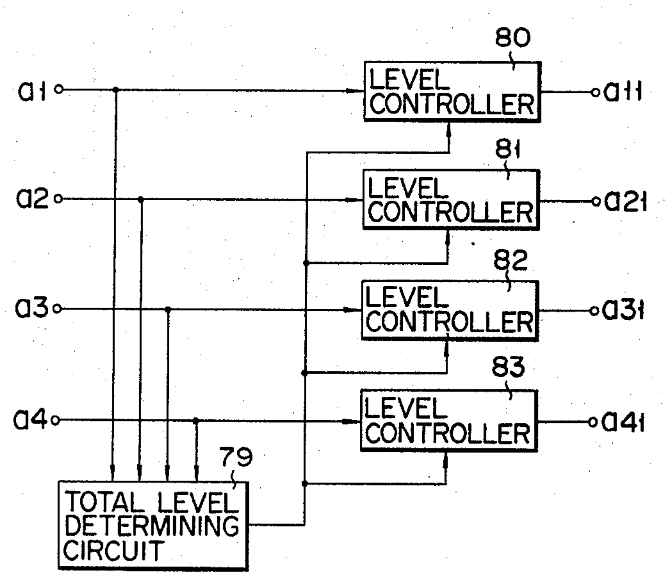
Figure 12:
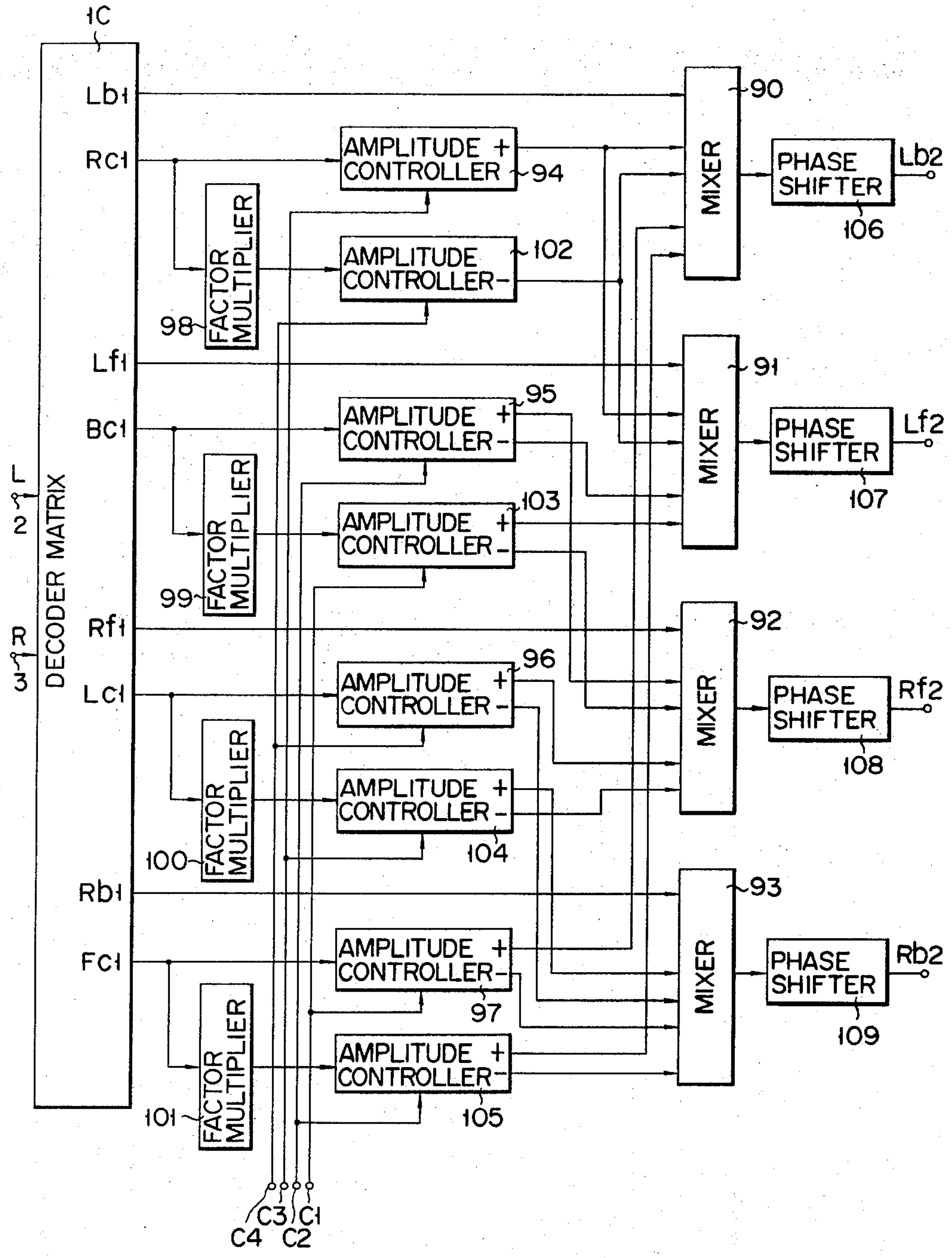
Figure 13:
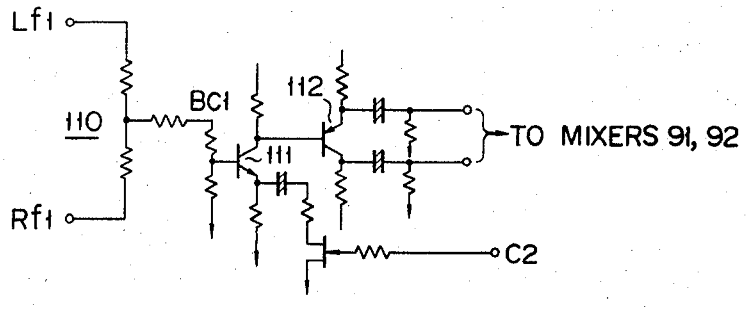
Figure 14:
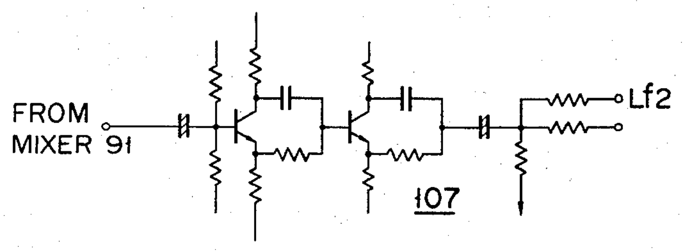
Figure 15:
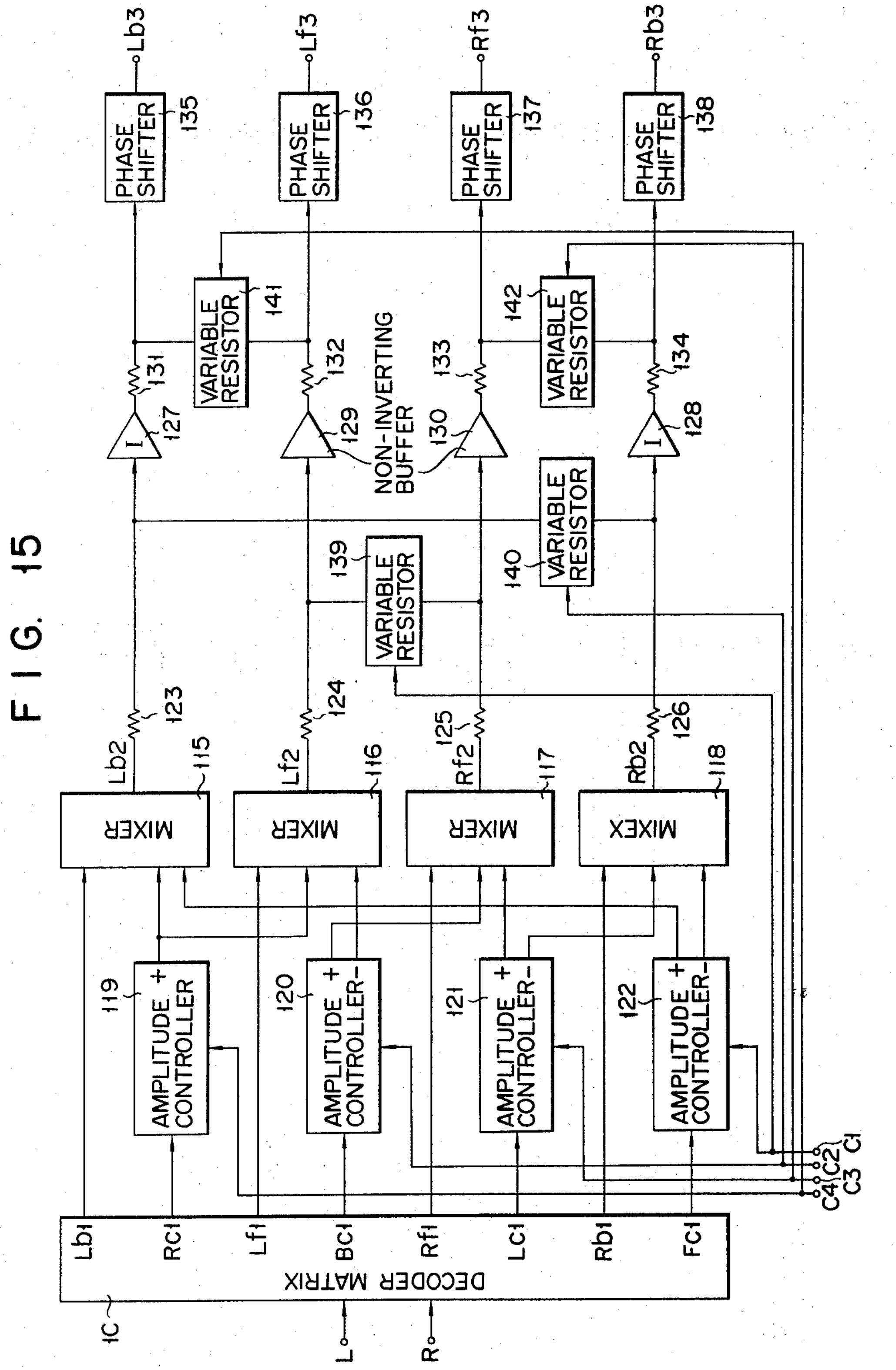

FIGS. *7a* and *7b* show a block diagram of a modified embodiment of this invention;

FIG. 8 is a graph showing the operating characteristic of the amplitude controller shown in FIG. 7;

FIG. 9 is a block diagram showing still another modification of this invention;

FIG. 10 is a block diagram of yet another modification of this invention;

FIG. 11 is a block diagram of a circuit for controlling the output level of the level detector shown in FIG. 10;

FIG. 12 is a block diagram of a further modification of this invention;

FIG. 13 is a detailed connection diagram of a portion of the decoder matrix circuit and the amplitude controller shown in FIG. 12;

FIG. 14 is a detailed connection diagram of a portion of the phase shifter shown in FIG. 12; and FIG. 15 is a block diagram of another embodiment of this invention.

Figure 1:
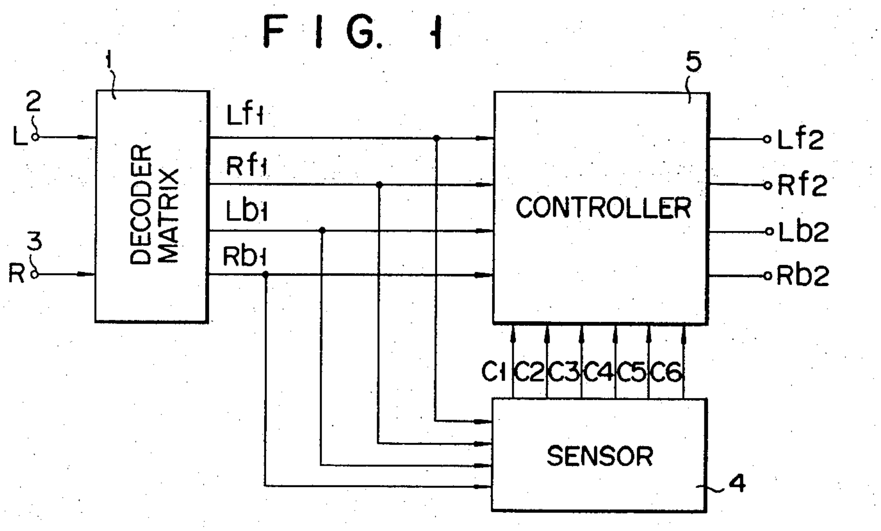
FIG. 1 shows a block diagram useful to explain the principle of the invention.

Referring now to FIG. 1 showing the block diagram useful to explain the principle of the invention, composite left and right signals L and R which are produced by the grooves of a phonograph disc are applied to input terminals 2 and 3 of a decoder matrix circuit 1. Signals L and R are obtained by applying to an encoder four-channel original signals Lf, Rf, Lb and Rb generated by four microphones, not shown, located on the left forward, right forward, left rearward and right rearward, respectively, with reference to listeners. The decoder matrix circuit 1 functions to form reproduced signals Lf1, Rf1, Lb1 and Rb1 corresponding to original signals Lf, Rf, Lb and Rb from the encoded signals L and R. Where the decoder matrix circuit 1 is of the so-called "Scheiber" type including a phase shifter, (see U.S. Pat. No. 3,632,886 to Scheifer) the relationship between the reproduced signals Lf1, Rf1, Lb1 and Rb1 and the original signals Lf, Rf, Lb and Rb are expressed by the following equations:

$$Lf1 = Lf + j\ 1/\sqrt{2}\,Lb\ 1/\sqrt{2}\,Rf \qquad (1)$$

$$Rf1 = Rf + 1/\sqrt{2}\,Lf - j\,1/\sqrt{2}\,Rb \quad (2)$$

$$Lb1 = Lb - j\,1/\sqrt{2}\,Rf + 1/\sqrt{2}\,Rb \quad (3)$$

$$Rb1 = Rb + 1/\sqrt{2}\,Lb + j\,1/\sqrt{2}\,Rf \quad (4)$$

As can be noted from these equations (1) to (4), in the case of the "Scheiber" type decoder matrix circuit, the leakage components to a particular channel from two adjacent channels are each $1/\sqrt{2}$, that is −3dB whereas the cross-talk from the opposite channel is zero. On the other hand, the leakage components to adjacent channels have the same phase between the forward two channels are rearward two channels, respectively, but have a phase difference of ±j, that is ±90° between the forward and rearward channels.

Suppose now that only the signals Lf and Rf in two channels contain original signals, then Rb = 0 and Lb = 0 so that equations (1) to (4) are rewritten as $$Lb1 = 1/\sqrt{2}\,Rf \quad (5)$$

$$Lf1 = Lf + 1/\sqrt{2}\,Rf \quad (6)$$

$$Rf1 = Rf + 1/\sqrt{2}\,Lf \quad (7)$$

$$Rb1 = j\,1/\sqrt{2}\,Rf \quad (8)$$

Considering the primary object of the four-channel system it is desirable that Lb1 = 0, Lf1 = Lf, Rf1 = Rf and Rb1 = 0. With reference to signals Lb1 and Rb1, the gain of the channels is made to zero by controlling the amplitudes of the signals. With regard to signals Lf1 and Rf1, the desired object can be accomplished by shifting the phase of signals Rb1 and Lb1 to +90° and −90° respectively, and then adding the phase shifted signals to signals Lf1 and Rf1, thus $$Lf2 = Lf1 + jRb1 = Lf + 1/\sqrt{2}\,Rf = j(j\,1/\sqrt{2}\,Rf)$$
$$= Lf\,1/\sqrt{2}\,Rf - 1/\sqrt{2}\,Rf = Lf \quad (9)$$

$$Rf2 = Rf1 + (-j)Lb1 = Rf + 1/\sqrt{2}\,Lf + (-j)(-j\,1/\sqrt{2}\,Lf)$$
$$= Rf + 1/\sqrt{2}\,Lf - 1/\sqrt{2}\,Lf = Rf \quad (10)$$

whereby ideal conditions are satisfied. This is one of many practical methods. Alternatively, by adding in the opposite phases the signals Lf1 and Rf1 shown in equations (6) and (7) with an amplitude of $1/\sqrt{2}$, we obtain $$Lf2 = Lf1 - 1/\sqrt{2}\,Rf1$$
$$= Lf1 + 1/\sqrt{2}\,Rf - 1/\sqrt{2}\,Rf - 1/2Lf = 1/2Lf \quad (11)$$

$$Rf2 = Rf1 - 1/\sqrt{2}\,Lf1$$
$$= Rf + 1/\sqrt{2}\,Lf - 1/\sqrt{2}\,Lf - 1/2Rf = 1/2Rf \quad (12)$$

It is also possible to make signals Lb1 and Rb1 to be equal to zero by amplitude control. Alternately, signals Lf2 and Rf2 expressed by equations (11) and (12) may be added together after their phases have been shifted by +90° and −90°, respectively. For example, $$Lb2 = Lb1 + \sqrt{2}Lf1 \cdot j - Rf1 \cdot j$$
$$= -1/\sqrt{2}\,Lf \cdot j + \sqrt{2}Lf \cdot j + Rf \cdot j - Rf \cdot j - 1/\sqrt{2}\,Lf \cdot j$$
$$= 0$$

If it is possible to judge from equations (5) to (8), for example, that only signals Lf and Rf are present and that signals Rb and Lb are zero or of extremely low level by utilizing outputs Lf1, Rf1, Lb1 anad Rb1 from the decoder matrix circuit 1 it would be possible to obtain satisfactory four-channel stereophonic sound reproduction.

Taking the sum of signals Lf1 and Rf1 and the sum of Lb1 and Rb1 and denoting these sums by Sf and Sb, respectively, we obtain $$Sf = (1 + 1/\sqrt{2})(Lf + Rf) \quad (13)$$

$$Sb = -j\,1/\sqrt{2}(Lf - Rf) \quad (14)$$

If signals Lf and Rf were independent each other their amplitude envelopes E(Sf) and E(Sb) would be similar and the ratio of their levels would be approximately $(1 = 1/\sqrt{2}) : (1/\sqrt{2}) = (1 = \sqrt{2}) : 1$. As a result, if $E(Sf) \times (1/\sqrt{2} + 1) - E(Sb)$ were zero or of extremely low level, it could be determined that only signals Lf and Rf are present and there are no other signals. However, where signals Lf and Rf are equal it is impossible to make correct judgment because they cancel each other vectorially according to equation (14). Accordingly, more accurate judgment can be made by comparing the sums of amplitude envelopes of signals Lf1, Rb1. A sensor 4 shown in FIG. 1 is constructed according to this principle for producing judgement outputs C1 to C6 which are applied to a controller 5. In response to these outputs C1 to C6, the controller produces outputs Lf2 = Lf, Rf2 = Rf, Lb2 = 0 and Rb2 = 0.

The detail of the sensor 4 will be described with reference to FIG. 2. The four reproduced output signals Lf1, Lb1, Rf1 and Rb1 of the decoder matrix circuit 1 shown in FIG. 1 are respectively applied to corresponding signal level detectors 6, 7, 8 and 9 for producing output voltages corresponding to the amplitudes of respective input signals. The outputs of signal level detectors 6, 7, 8 and 9 for adjacent two channels are applied to mixers 10, 11, 12 and 13 and are mixed each other therein. The outputs from mixers 10, 11, 12 and 13 are supplied to level comparators 14, 15, 16, 17, 18 and 19 together with adjacent channel signals other than those applied to respective mixers at an amplitude ratio of $1 : (1/1 + \sqrt{2})$. Each level comparator operates to mix together at opposite phases outputs of two mixers thereby producing outputs corresponding to the absolute values of the difference between the levels of two signals C2(Rb, Lb), C1(Lf, Rf), C3(Lb, Lf) and C4(Rf, Rb). These outputs C1, C2, C3 and C4 are voltages of zero or extremely small value when only one or two of the pairs of channel signals Rb and Lb, Lf and Rf, Lb and Lf and Rf and Rb have a large amplitude whereas the other pairs of channel signals have a level of zero or extremely small value. As the condition departs from that just described the output voltages increase. Where the signals of opposing two channels are significant it is possible to make a judgement the presence of the cross-talks by comparing the amplitude envelope of said signals and of the signals of other opposing channels. Thus, the amplitude envelope of signals Lb1 and Rf1 and that of signals Lf1 and Rb1 are compared in level comparators 14 and 19, respectively, at a ratio of 1 : 1. Output voltages C5(Lf, Rb) and C6(Lb, Rf) show zero or relatively small value when one or both of the signals of opposing channels Lf and Rb, and Lb and Rf have a high level. With this construction, it is possible to judge the original information in four channels except a case wherein signals of any two channels are considerably larger than the signals of the other channels.

Figure 3:
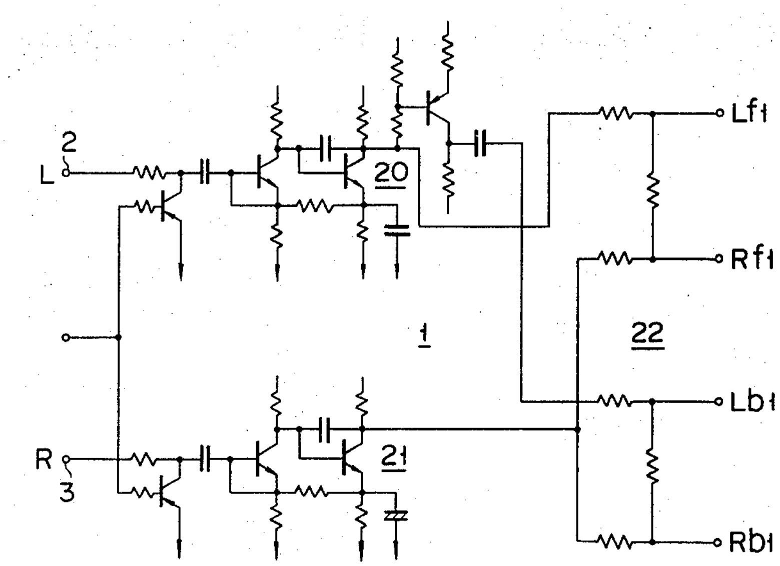
FIG. 3 is a connection diagram showing one example of the decoder matrix circuit shown in FIG. 1.

FIG. 3 shows the detail of one example of the decoder matrix circuit shown in FIG. 1. The left and right overall signals applied to input terminals 2 and 3 are adjusted in their amplitudes and phases by the action of transistor circuit stages 20 and 21 respectively. The levels of the outputs of these stages are set to predetermined values by a level setting circuit stage 22 and applied to four output terminals as reproduced signals Lf1, Rf2, Lb1 and Rb1, respectively.

Figure 2:
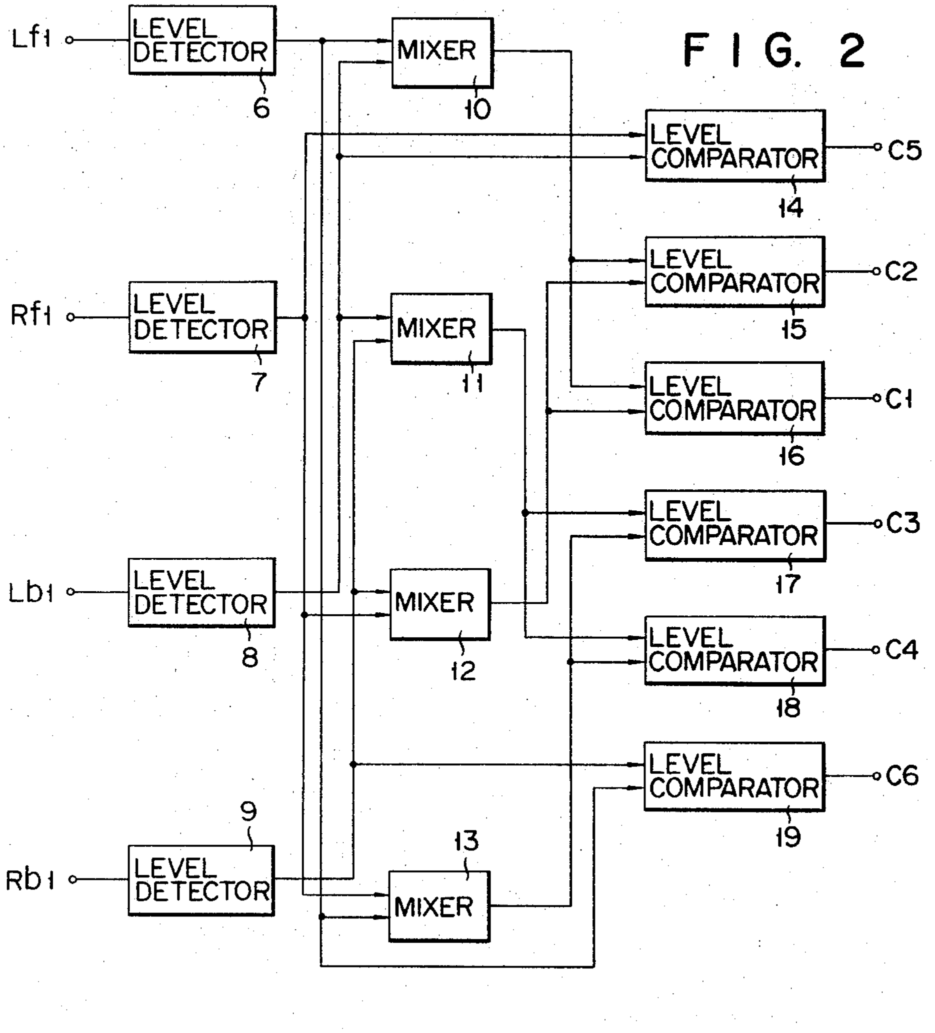
FIG. 2 is a block diagram of one example of a sensor embodying the invention.
Figure 4:
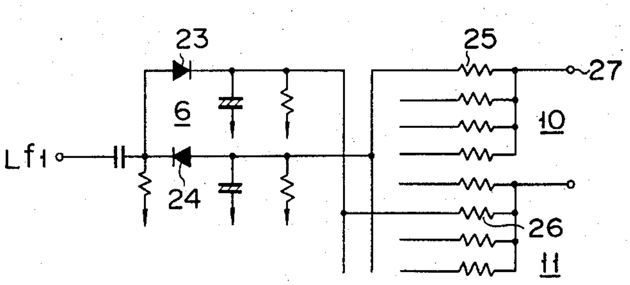
FIG. 4 shows a connection diagram of one portion of the level detector and the mixer shown in FIG. 3.

FIG. 4 shows the detail of the level detector 6 and the mixer 10 shown in FIG. 2. Level detectors 7, 8 and 9 and mixers 11, 12 and 13 are constructed similarly. The level detector 6 comprises a pair of diodes 23 and 24 connected in parallel opposition for detecting the levels of the positive and negative half cycles of the input signal Lf1. The output from the level detector 6 is applied to one ends of the resistors 25 and 26 of the mixers 10 and 11. Mixer 10 comprises four resistors 25. Although not shown, one terminals of the resistors other than that supplied with the output from detector 6 are connected to the output terminals of level detectors 7, 8 and 9. The opposite ends of resistors 25 are commonly connected to a terminal 27. In the case of FIG. 2, although the level of only one polarity of the input signal is detected, it is also possible to detect the levels of both polarities as shown in FIG. 4.

As above described, the sensor 4 provides six judgment signals C1 to C6. Let us now describe the controller 5 which in response to these judgment signals produces desired reproduced signals Lf2, Rf2, Lb2 and Rb2 from the reproduced output signals Lf1, Rf1, Lb1 and Rb1 of the decoder matrix circuit 1.

Figure 5:
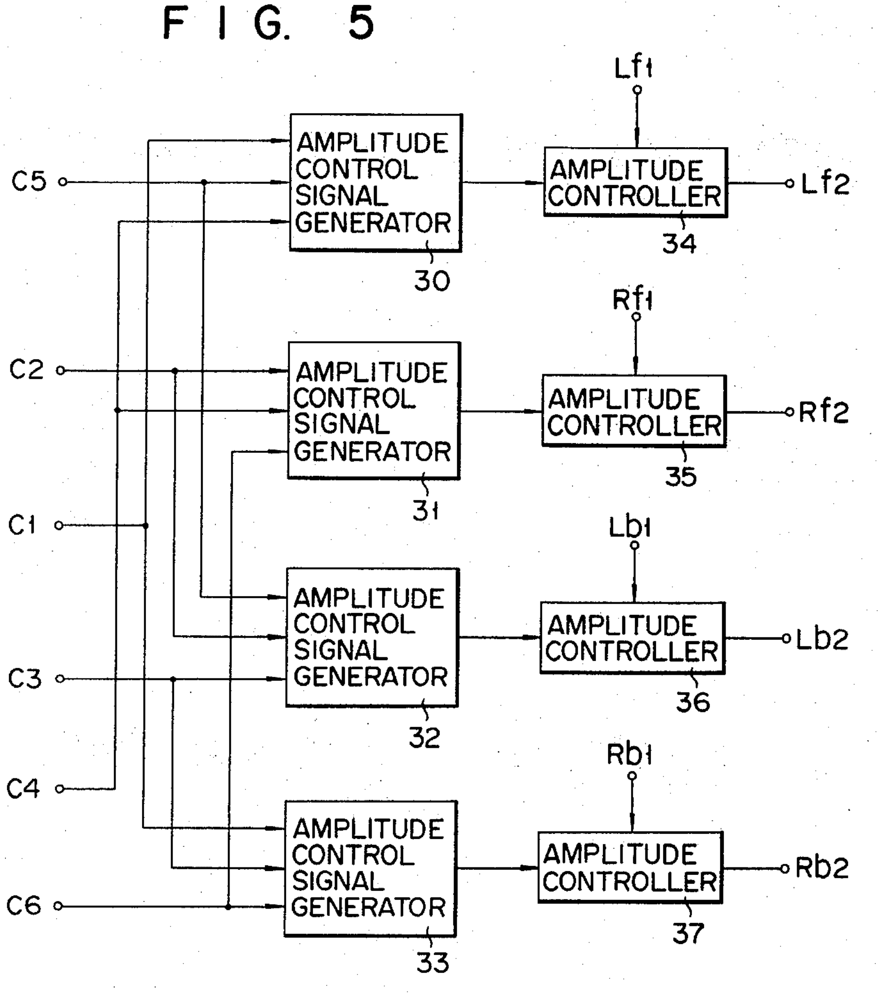
FIG. 5 is a block diagram of one example of the controller shown in FIG. 1.
Figure 6:
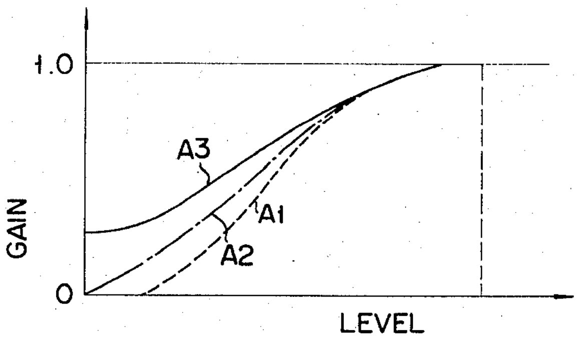
FIG. 6 is a graph showing the operating characteristic of the amplitude controller shown in FIG. 5.

FIG. 5 shows the block diagram of a controller of relatively simple construction which responds to the outputs of the level comparator for decreasing the signal level of the channel which does not contain the original information but permits to pass freely the cross-talk between adjacent channels which contain signals of high levels thereby producing reproduced signals containing such cross-talk. The judgment signals C5 (Lf, Rb), C2 (Rb, Lb), C1 (Lf, Rf), C3 (Lb, Lf), C4 (Rf, Rb) and C6 (Lb, Rf) are applied two channels of amplitude control signal generators 30, 31, 32 and 33 corresponding to two channels except two channels contained in respective parentheses. The amplitude control signal generators 30, 31, 32 and 33 are amplitude controllers 34, 35, 36 and 37 are provided respectively to correspond to signals Lb, Lf, Rf and Rb (or Lb1, Lf1, Rf1 and Rb1). For example, signal C5 (Lf, Rb) is applied to amplitude control signal generators 30 and 32 corresponding to the signals of two channels other than Lf and Rb, that is Lb and Rf. Other judgment signals are applied similarly. Each of the amplitude control signal generators 30, 31, 32 and 33 operates to preferentially produce an output corresponding to a judgment signal of the lowest level among these judgment signals applied thereto and may be composed of an alalogue AND circuit. Respective amplitude control signal generators 30, 31, 32 and 33 supply control signals to amplitude controllers 34, 35, 36 and 37, respectively so as to control the amplitudes of signals Lb1, Lf1, Rf1 and Rb1 according to a desired characteristic of the type wherein where the level of the amplitude control signal voltage is low, the gain is set to a small value, whereas where the level of the amplitude control signal is high the gain is set to a value, as shown in FIG. 6. Where signals are present in predetermined two channels alone and other channels contain no signal, the characteristic A2 which becomes zero when the amplitude control signal is at a zero level is used for the purpose of reducing to zero the levels of the reproduced output channels corresponding to the channels containing no signal or characteristic A1 is used by considering the effect of noises or the like so that a zero gain can be provided even when the level of the amplitude control signal is slightly higher than zero. With this measure, it is possible to completely eliminate the leak between channels.

Actually, however, there is an influence of the echo. It has been determined by physiological experiment that the sound image can be brought close to the position to the sound source having higher level by giving a difference in sound volume of from 10 dB to 15 dB. For this reason, when a characteristic as curve A3 is selected which provides a control of 7 to 12 dB at the zero level the sound attenuates and builds up more naturally. This alleviates the requirements for evenness of the characteristics of the amplitude control signal generators 30 to 33 and amplitude controllers 34 to 37.

With the constructions shown in FIGS. 2 and 5 it is possible to prevent the leakage from two channels containing signals of high levels to channels containing no signals. Such system can also be used in a case which does not include any phase shifter on the reproducing side.

Another embodiment which utilizes signals of the opposite phase for the purpose of cancelling the cross-talk occuring between two channels containing signals of high levels will now be described. According to this modified embodiment, the amplitude and phase of the signals of specific channels are adjusted and the resulting adjusted signals are added to the outputs of the specific channels as shown by equations (9) and (10 ) or equations (11) and (12).

FIG. 7 shows the block diagram of this modification. The judgment that the levels of what two channel original information signals are high is made in the same manner as that described in connection with FIG. 2. In this modification, a controller 5 is used for the four channel stereophonic sound reproducing system utilizing the judgment signals C1 to C6 shown in FIG. 2. More particularly, the outputs of a two-channel transmission system are applied to phase shifters 40 and 41 for producing signals P1, P2, P3 and P4 and signals Q1, Q2, Q3 and Q4 respectively, which are dephased $\pi/2$, respectively. These signals are applied to a decoder matrix circuit 1a to produce signals Lb1, LF1, Rf1 and Rb1, opposite phase signals −Lb1, −Lf1, −Rf1, and −Rb1, and signals Lb1·j, Lf1·j, Rf1·j and Rb1·j and signals −Lb1·j, −Lf1·j, −Rf1·j and Rb1·j which are dephased $\pi/2$ with respect the first two groups of signals.

In this manner, signals having phase differences of $\pm\pi/2$ and $\pi$ with respect to signals Lb1, Lf1, Rf1 and Rb1 are produced. For example, signal Lb1 is produced by mixing together signals P1 and Q3 at a prescribed ratio. In order to produce a signal dephased therefrom by $+\pi/2$, signals P2 and Q4 dephased from signals P1 and Q3 by $+\pi/2$ are mixed together at said prescribed ratio. Signals of the opposite phase can be produced by a phase inverter.

Signals Lb2, Lf1, Rf1 and Rb1 among various signals produced as above described are applied to corresponding mixers 42, 43, 44 and 45, respectively, whereas signals Lb1·j, –Lb1·j,Lf1·j, –Lf1·j, Rf1·j, –Rf1·j, Rb1·j and –Rb1·j are applied to amplitude controllers 46, 47, 48 49, 50, 51, 52 and 53, respectively. Pairs of signals Lf1·j and –Rb1·j, –Lb1·j and Rf1, Rb1·j and –Lf1 and –Rf1·j and –Lb1 are respectively mixed together by mixers 54, 55, 56 and 57 to reduce their amplitude to $1/\sqrt{2}$ and the outputs of these mixers are applied to amplitude controllers 58, 59, 60 and 61, respectively. Each amplitude controller is controlled by the judgment signals C5 and C6 produced by the sensor shown in FIG. 2. Signal C1 controls amplitude controllers 52 and 47, signal C2 amplitude controllers 51 and 48, signal C3 amplitude controllers 53 adn 50, signal C4 amplitude controllers 49 and 46, signal C5 amplitude controllers 60 and 58 and signal C6 amplitude controllers 61 and 59, respectively.

The outputs from amplitude controllers 46, 47 and 60 are applied to mixer 44, those from amplitude controllers 48, 49 and 61 to mixer 45, those from amplitude controllers 50, 51 and 58 to mixer 42 and those from amplitude controllers 52, 53 and 59 to mixer 43.

The amplitudes of the outputs from respective mixers 42 to 45 are controlled by amplitude controllers 65, 66, 67 and 68 under the control of the outputs from amplitude control signal generators 62 to 64 to obtain outputs Lb2, Lf2, Rf2 and Rb2. In the embodiment shown in FIG. 7, however, a portion of FIG. 5 is modified such that control signals C5 and C6 are not used, and where there are signals in only opposing signals as there is no cross-talk between these signals, the leaks to other opposing channels are cancelled by reducing the amplitudes of these signals to $1/\sqrt{2}$ and by taking into consideration the phase difference therebetween. However, it is also possible to control the amplitude directly by signals C5 and C6, as shown in FIG. 5. In this case, in the construction shown in FIG. 7 the decoder matrix circuit 1a is not required to produce signals –Lb1, –Lf1, –Rf1 and –Rb1. Furthermore, it is not necessary to provide mixers 42 to 45 and amplitude controllers 58, 59, 60 and 61. Alternately, signals C5 and C6 may be applied to only amplitude control signal generators 62 and 64, and 63 and 65, respectively, as shown in FIG. 5.

The four-channel stereophonic sound reproducing system shown in FIG. 7 operates as follows:

In a case wherein there are only two original information signals Lf and Rf and the original information signals Lf and Rb do not appear, the judgment signal C1 (Lf, Rf) has a zero level or a very low level whereas the other judgment signals C2, C3 . . . C6 have large levels as seen from FIG. 2 and the discussion thereof.

Under the control of input control signals C1 to C6, respective amplitude controllers 46 to 53 and 58 to 61 operate such that they produce large outputs when the input control signals are at low levels whereas small outputs when the input control signals are at high levels. These characteristics will be described in detail with reference to FIG. 8.

Where the level of signal C1 is low and the levels of signals C2 to C6 are high respective amplitude controllers are controlled by output signal C1, so that the output levels of amplitude controllers 47 and 52 are high whereas those of the remaining amplitude controllers are extremely low. As a result, it is possible to cancel the leak from signals Lf and Rf to signals Rf1 and Lf1 by shifting the phases $-\pi/2$ and $+\pi/2$, respectively of the leak signals to Lb1 and Rb1. Thus, a condition is reached where Lf2 = Lf and Rf2 = Rf thereby making it possible to theoretically attain 100 percent separation of the signals Lf1 and Rf1. On the other hand, signals Lb1 and Rb1 are used directly as signals Lb2 and Rb2 which are controlled in their amplitude by the operation as has been described in connection with FIG. 5 to produce a condition wherein Lb2 ≈ O and Rb2 = O, or the amplitude is greatly reduced. In other words, where signals are present on only two channels, 100 percent separation is attained thus eliminating any leakage to other channels.

The operating characteristics of the amplitude controllers 46 to 53 and 58 to 61 are opposite to those of amplitude controllers 65 to 68, that is when the control input is large, the output is small, whereas when the control input is small, the output is large as shown by curves A1*a*, A2*a* and A3*a* in FIG. 8. Curves A1, A2 and A3 are opposite to curves A1*a*, A2*a* and A3*a*. Alternately amplitude controllers 46 to 61 may be constructed to have the same construction as the amplitude controllers in which case the control signals are inverted by inverters.

The four-channel stereophonic sound reproducing system having the above described construction has following advantages. More particularly, where the levels of the signals of any two channels are high and those of the other two channels are relatively low it is possible to greatly reduce the cross-talk between the two channels having high signal levels and the leaks to the other channels thereby enabling the matrix system to have a channel separation approximately equal to that of the discrete four-channel system. Since the system can operate similarly where the signal is present in only one channel, it is also possible to efficiently prevent or reduce the cross-talk and the leak when the level of the signal of only one or two channels among four channels is high. Further, as above described, by making control characteristic curves to have smooth forms which is necessary to perform an amplitude control of minimum quantity it is possible to provide an efficient separation of the sound corresponding to the difference in relative levels without changing extremely the levels of the original four-channel information, thus producing an effect of music play approximating the actual play.

Various modified embodiments of the four-channel stereophonic sound reproducing system will be described hereinafter.

1. Above described first and second embodiments are typical examples of this system. In the second embodiment, the circuit of the first embodiment is modified by adding thereto means for interconnecting respective channels for the purpose of improving the separation between two channels of high signal levels. However, the same degree of separation is not necessary for all channels. For example, where a high degree separation is required for two forward channels, only the circuit necessary for this purpose is retained in the embodiment shown in FIG. 2 and other circuits may be eliminated.

FIG. 9 shows such a modified embodiment.

2. This embodiment represents one modification embodying the principle of this invention. However it should be understood that various circuit constructions can also be used without departing from the scope of the invention.

A. For example, in the second embodiment, for the purpose of eliminating the cross-talk between channels having high signal levels, the circuit was constructed according to equations (9) and (10), but is should be understood that it is also possible to construct the circuit according to equations (11) and (12).

3. While this embodiment relates to a Scheiber type matrix circuit utilizing a 90° phase shifter, such phase shifter may be eliminated. It is also possible to construct the circuit of this invention by using an SQ matrix circuit. Only a few modifications are shown herein.

3-1. Although FIG. 9 shows a block diagram of the above described modification 1 it will be clear that various modifications and applications can be made for different objects. The circuit shown FIG. 9 is constructed such that it treats mainly signals Lf and Rf so that it is effective where the levels of either one or both of signals Lf and Rf are high whereas the levels of other signals Lb and Rb are zero or relatively small, thereby minimizing the cross-talk between signals Lf1 and Rf1 and the leak to signals Lb1 and Rb1.

A decoder matrix circuit 1b provides outputs Lb1, Lf1, Rf1 and Rb1 in addition of Lb1j, −Lb1j, Rb1j and −Rb1j. Output signals Lb1j, Lf1, Rf1, and −Rb1 are applied to level detectors 6, 7, 8 and 9, respectively. Since signals Lb1 and Rb1 are not applied to level detectors 6 and 9 as in the case of FIG. 2, but instead phase shifted signals Lb1j and −Rb1j are applied thereto for the purpose of having a correct judgment where signals Lf and Rf are present concurrently while there is no signal in other channels. Considering this conditioon by the aid of equations 5, 6, 7 and 8, when phase shifters are used, the phases of signals Lf and Rf acting as Lb1 and Rb1 are phase shifted by $-\pi/2$ and $+\pi/2$, respectively. Consequently, when the phases of the signals are shifted, the signal levels (amplitude levels or peak levels) generally vary somewhat so that comparison of the signal levels becomes more or less inaccurate. For this reason, where the amplitude level or peak level is to be detected by the level detector, it is advantageous to compare the levels after the phases of the signals have been shifted + 90° and − 90°, respectively. This is also true in the circuit shown in FUG. 2, and more accurate result can be obtained when the signals are independently detected in discrete judging circuits as above described. The levels of signals Lf1 and Rf1 detected by level detectors are attenuated to a level of $(1/(1+\sqrt{2}))$ whereas the detected levels of signals Lb1j and −Rb1j are not attenuated but these detected levels are made to have phases opposite to the detected levels of Lf1 and Rf1. In other words, these output signals are mixed each other by mixer 70 so that the absolute value of the difference between the former and the latter can be determined. The output C (Lf, Rf) from mixer 70 becomes zero or approximately zero when only signals Lf and Rf are present. Where signals are present in other channels, the level of the output increases with the level of such signals. Output signal C (Lf, Rf) is applied to amplitude controllers 71 and 72 whereby after the amplitudes being controlled, signals −Lb1j and Rb1j are mixed respectively by mixers 73 and 74 to obtain outputs Lf2 and Rf2, respectively.

On the other hand, output signal C (Lf, Rf) is impressed upon amplitude controllers 75 and 76 to control the amplitudes of signals Lb1 and Rb1. The operating characteristics of amplitude controllers 71, 72, 75 and 76 are shown in FIGS. 8 and 6, respectively. Mixers 75 and 76 produce outputs Lb2 and Rb2, respectively.

Where either one or both of signals Lf and Rf of two channels have high levels and the levels of signals Lb and Rb in other chemicals are zero, signals Lf and Rf will be derived out in a perfectly isolated condition from signals Lf2 and Rf2. Moreover, the leaks to signals Lb2 and Rb2 can be eliminated. Further, by performing smooth controls as shown by the characteristic curves of FIGS. 6 and 8, where the signals Lb and Rb have relatively low levels, the circuit operates efficiently. With this simple construction, the cost of the circuit can be reduced.

The principle of the invention is also applicable to other types of the decoder matrix circuit. For example, a 90° phase shifter may be provided on the encoder side but may be eliminated from the side of reproduction for the purpose of simplifying the circuit construction.

The outputs decoded by decoder matrix circuit 11 are expressed by the following equations:

$$Lf1 = lf - 1/\sqrt{2}Lb + 1/\sqrt{2}Rf \quad (15)$$

$$Lb1 = j1/\sqrt{2}Lf - jLb - j1/\sqrt{2}Rb \quad (16)$$

$$Rf1 = 1/\sqrt{2}Lf + Rf + 1/\sqrt{2}Rb \quad (17)$$

$$Rb1 = -j1/\sqrt{2}Lb - j1/\sqrt{2}Rb - jRb \quad (18)$$

The same object as the first embodiment can be accomplished under these conditions.

Substituting the condition Lb = 0 and Rb = 0 in equations (15) to (18), we obtain $$Lf1 = Lf + 1/\sqrt{2}Rf \quad (19)$$

$$Lb1 = j1/\sqrt{2}Lf \quad (20)$$

$$Rf1 = Rf + 1/\sqrt{2}Lf \quad (21)$$

$$Rb1 = -j1/\sqrt{2}Rf \quad (22)$$

In this case no phase shifter is provided, necessary cancellation of the cross-talk is made according to equations (11) and (12).

Thus,
$$Lf2 = 2(Lf1 - 1/\sqrt{2}Rf1) = 2(Lf + 1/\sqrt{2}Rf - 1/\sqrt{2}Rf - 1/2Lf) = Lf \quad (23)$$

Similarly,
$$Rf2 = 2(Rf1 - 1/\sqrt{2}Lf1) = 2(Rf + 1/\sqrt{2}Lf - 1/\sqrt{2}Lf - 1/\sqrt{2}Rf) = Rf \quad (14)$$

Referring now to FIG. 10, L and R represent outputs of a two-channel transmission and in response to these outputs, signals Lb1, Lf1, Rf1 and Rb1 are produced by a decoder not provided with a 90° phase shifter and the levels of these output signals are detected by level detectors 6, 7, 8 and 9, respectively.

The levels of the signals Lf1 and Rf1 detected by level detectors are made to be equal to $(1/1+\sqrt{2}$ while the levels of the outputs of level detectors corresponding to signals Lb1 and Rb1 are not changed but their phases are made to be opposite each other. In other words, the mixer 70 determines the absolute value of the difference betweeen the output signals of the opposite phase and the output signal C (Lf, Rf) obtained in this manner is used to control amplitude controllers 71, 72, 75, 76, 77 and 78.

Amplitude controllers 71, 72 and 75 and 76 are operated with the operating characteristics shown in FIGS. 8 and 6 respectively. As can be noted from equations (11), (12) or (23), (24), since the level of the signal is decreased 6 dB by cancellation, amplitude controllers 77 and 78 are provided for the purpose of compensating for this decrease and are designed such that they afford a gain of +6 dB where the signal C (Lf, Rf) is zero and to decrease the gain as the level of signal C (Lf, Rf) increases.

Signals Lf1 and Rf1 are applied to mixers 73 and 74 with forward phases while the outputs of amplitude controllers 71 and 72 are attenuated to $1/\sqrt{2}$, respectively and then applied to mixers 73 and 74 at opposite phases. The outputs of these mixers are applied to amplitude controllers 77 and 78, respectively. The outputs Lb2, Rb2, Lf2 and Rf2 of amplitude controllers 75, 76, 77 and 78 correspond to the desired reproduced signals.

In the foregoing descriptions regarding first and second embodiments the separation of only signals Lf and Rf was discussed, but it will be clear that the same consideration is also applicable to the combinations of other channels.

Alternately, the advantage of the invention can be increased by normalizing respective outputs a1, *a*2, *a*3 and *a*4 of various level detectors 6, 7, 8 and 9 and by performing similar controls with the relative ratio between the levels of respective signals instead of controlling or judging in accordance with the signal levels as in the foregoing embodiments.

The normalization can be accomplished by controlling the input levels to respective level detectors such that the sum or the maximum level of outputs *a*1, *a*2, *a*3 and *a*4 is maintained always at a constant level. This can be accomplished by providing constant amplitude controllers (not shown) on the input sides of respective level detectors, applying outputs *a*1, *a*2, *a*3 and *a*4 to constant amplitude control signal generators, detecting the total sum or the maximum level aT of these outputs and generating a constant amplitude control signal which so controls the constant amplitude controller that the maximum level aT is maintained always constant.

FIG. 11 shows a modification embodying the latter method. The outputs *a*1, *a*2, *a*3 and *a*4 of the level detectors shown in FIGS. 2, 9 and 10 are applied to total level determining circuit 79 to obtain the sum or the maximum level signal *a*T of outputs *a*1, *a*2, *a*3 and *a*4. The maximum level signal *a*T is commonly applied to amplitude controllers 80, 81, 82 and 83 as a control signal while outputs, a1, a2, a3 and a4 are applied to respective amplitude controllers so as to be controlled by the maximum level signal *a*T. In this manner, the control characteristics are determined such that the sum or the maximum level of output signals *a*'11, *a*'21, *a*'31 and *a*'41 is maintained substantially constant.

In the foregoing embodiments, a method has been described wherein the fact that which one of the channel signal levels is high among four-channel original information is determined by using the reproduced four-channel signals or two-channel transmission system output signals whereby to eliminate leak signals between reproduced four channel signals by using a logic circuit where only one four-channel original information is present or where only two-channel original information is present. This method enables complete elimination of the cross-link. However, four-channel original information is not always present in two channels so that where all four-channel original information exists, it is necessary to rely upon a prescribed regular matrix system in which the logic circuit is not operative. However, when the leak signals are cancelled by a logic signal the acoustic output energy will be decreased to a value which is smaller than that obtained when the logic circuit is inoperative. This is not desirable from the standpoint of sound feeling. To solve this problem a method may be used wherein after cancelling the leak signals to other channels respective channel outputs are applied to amplitude controllers so as to compensate for the total output level. This method, however, requires an additional compensating circuit thus complicating the circuit construction.

Following example shows a simplified four channel stereophonic sound reproducing system designed to cancel the leak of the signals between adjacent channels while at the same time compensate for the decrease in the acoustic output energy caused by the cancellation of the leak signal. The basic principle of this embodiment will be described with reference to the accompanying drawing.

The reproduced four-channel information produced by a Scheiber type matrix circuit not using a phase shifter is expressed by the following equations:

$$Lb1 = Lb - 1/\sqrt{2}Lf + 1/\sqrt{2}Rb \quad (25)$$

$$Lf1 = Lf - 1/\sqrt{2}Lb + 1/\sqrt{2}Rf \quad (26)$$

$$Rf1 = Rf + 1/\sqrt{2}Lf + 1/\sqrt{2}Rb \quad (27)$$

$$Rb1 = Rb + 1/\sqrt{2}Lb + 1/\sqrt{2}Rb \quad (28)$$

Let us represent the signals of the reproduced four-channel information at the forward center, rearward center, left side center and right side center of the control channels positioned at the middle between respective adjacent channels by Fc1, Bc1, Lc1 and Rc1, respectively. These control channel information signals can be readily prepared from signals L and R by using a resistance matrix circuit as shown according to the following equations:

$$Fc1 = 1/\sqrt{2}L + 1/\sqrt{2}R \quad (29)$$

$$Bc1 = -1/\sqrt{2}L + 1/\sqrt{2}R \quad (30)$$

$$Lc1 = L \quad (31)$$

$$Rc1 = R \quad (32)$$

These control channel information signals Fc1, Bc1, Lc1 and Rc1 can be expressed as follows in terms of the four-channel information components.

$$Fc1 = 0.924\ Lf + 0.924\ Rf - 0.383\ Lb + 0.383\ Rb \quad (33)$$

$$Bc1 = 0.924\ Lb + 0.924\ Rb - 0.383\ Lf + 0.383\ Rf \quad (34)$$

$$Lc1 = 0.924\ Lf - 0.924\ Lb + 0.383\ Rf - 0.383\ Rb \quad (35)$$

$$Rc1 = 0.924\ Rf + 0.924\ Rb + 0.383\ Lf + 0.383\ Lb \quad (36)$$

Consider now a case wherein among four-channel original information only two-channel signals Lf and Rf are present and signals Rb and Lb are zero. That is Rb = 0 and Lb = 0. Then equations (25), (26), (27), (28), (33), (34), (35) and (36) are rewritten as follows:

$$Lb1 = -1/\sqrt{2}Lf \quad (37)$$

$$Lf1 = Lf + 1/\sqrt{2}Rf \quad (38)$$

$$Rf1 = Rf + 1\ \sqrt{2}Lf \quad (39)$$

$$Rb1 = 1/\sqrt{2}Rf \quad (40)$$

$$Fc' = 0.924\ Lf + 0.924\ Rf \quad (41)$$

$$Bc' = -0.383\ Lf + 0.383\ Rf \quad (42)$$

$$Lc' = 0.924\ Lf + 0.393\ Rf \quad (43)$$

$$Rc' = 0.924\ Lf + 0.383\ Rf \quad (44)$$

Considering the inherent object of the four-channel system, it is desirable that Lb1 = 0, Lf1 =$\alpha$Lf, Rf1 = $\alpha$Rf and Rb1 = 1, where $\alpha$ represents a coefficient necessary for compensating for the decrease in the acoustic output energy caused by the cancellation of the signal leak between four channels for the reproduction and $\alpha > 1$. Multiplying Bc1 with coefficients −k and +k, respectively, and adding the products to Lf1 and Rf1 respectively, we obtain $$\begin{aligned} Lf2 &= Lf1 - kBc1 \\ &= Lf + 1/\sqrt{2}Rf + 0.383\ k\ Lf - 0.383\ k\ Rf \\ &= (1+0.383\ k)Lf + (1/\sqrt{2}-0.383\ k)Rf \end{aligned} \quad (45)$$

$$\begin{aligned} Rf2 &= Rf1 + k\ Bc1 \\ &= Rf + 1/\sqrt{2}Lf - 0.383\ k\ Lf + 0.383\ k\ Rf \\ &= (1+0.383\ k)Rf + (1/\sqrt{2}-0.383\ k)Lf \end{aligned} \quad (46)$$

When selecting a value of $k = (1/\sqrt{2} \times (3/0.383)$, then Lf2 = 1.707Lf and Rf2 = 1.707Rf. Thus, it is possible to perfectly cancel out the leak signal. Actually, however, when enjoying a four channel stereophonic sound reproducing system there is the effect of echoes and it has bear determined by the physiological experiment that when a difference of sound volume is given between channels, the sound image can be brought close to the position of the sound source. Accordingly, it is preferred to select the value of $k$ in relation to $\alpha$ such that the quantity of the leak amounts of 10 to 15 dB.

Considering now signals Lb1 and Rb1, when signals Fc1 is multiplied by coefficients of +u and −u respectively and the products are added together $$\begin{aligned} Lb2 &= Lb1 + uFc1 \\ &= (-1/\sqrt{2}+0.924u)Lf + 0.924uRf \end{aligned} \quad (47)$$

$$\begin{aligned} Rb2 &= Rb1 - uFc1 \\ &= (1/\sqrt{2}-0.924u)Rf - 0.924uLf \end{aligned} \quad (48)$$

For instance, where $k = 1$ and $u = 0.383$, from equations (45), (46), (47) and (48), signals Lb2, Lf2, Rf2 and Rb2 can be expressed as follows.

$$Lb2 = -0.354Lf + 0.354Rf \quad (49)$$

$$Lf2 = 1.383Lf + 0.324Rf \quad (50)$$

$$Rf2 = 1.383Rf + 0.324Lf \quad (51)$$

$$Rb2 = -0.354Lf + 0.354Rf \quad (52)$$

The cross-talk between channel signals, for example, the cross-talk between signals Lb2 and Lf2 is expressed by the ratio of an Lf component of signal Lf2 and an Lf component of signal Lb2, thus $$20\ \log_{10}(0.354/1.383)\ (dB)$$

which is larger than about −12 dB.

The acoustic output energy P can be expressed by the sum of the squares of the original information components produced by respective loudspeakers, and the acoustic output energy when the difference of the sound volume is not applied where the cross-talks between channels are not cancelled is expressed by $$PLf = PRf = 2$$

On the other hand, when the cross-talks between channels are cancelled $$PLf = PRf \approx 2.2$$

thus maintaining the acoustic output energy at a substantially constant value. Of course, it is possible to arbitrarily select the values of coefficients k and u in relation to the quantity of leak and the value of the acoustic output energy. Although above description refers to a case where Lf and Rf contain the original information, the same description also applies for the cases where Lb and Lf, Rf and Rb, and Rb and Lb contain original information. But due consideration should be payed for the polarities of the signals.

FIG. 12 shows a modified embodiment of this invention which uses phase shifters. Two transmission circuit signals L and R are applied to a decoder matrix circuit 1C which functions to produce reproduced four-channel signals Lb1, Lf1, Rf1 and Rb1 and control signals Fc1, Bc1, Lc1 and Rc1. The reproduced four-channel signals Lb1, Lf1, Rf1 and Rb1 are applied to mixers 90, 91, 92 and 93 respectively whereas the control signals Fc1, Bc1, Lc1 and Rc1 are applied to amplitude controllers 94, 95, 96 and 97 respectively and also to coefficient multipliers 98, 99, 100 and 101 respectively. Signals applied to these coefficient multipliers are respectively multiplied by a factor of 0.383 and the resulting products are applied to amplitude controllers 102, 103, 104 and 105, respectively. Judgment signals C1, C2, C3 and C4 are prepared by input signals L and R or by the reproduced four-channel signals Lb1, Lf1, Rf1 and Rb1, or by the circuit shown in FIG. 2. Signal C3 is applied to the amplitude controllers 94 and 104, signal C4 to the amplitude controllers 102 and 96, signal C2 to the amplitude controllers 95 and 105 and signal C1 to the amplitude controllers 103 and 97 respectively as the amplitude control signals. The outputs from respective amplitude controllers 94 to 97 and 102 to 105 are applied to mixers 90 to 93 in the following manner. More particularly, the output from amplitude controller 94 is applied to mixers 90 and 91 with positive polarity with respect to the input to the amplitude controller 94, and the output of the opposite polarity from the amplitude controller 102 is applied to the same mixers 90 and 91. The positive output from amplitude controller 95 is applied to mixer 92 while the negative output to mixer 91. The positive output from amplitude controller 103 is applied to mixer 91 while the negative output to mixer 92. In the same manner, the positive and negative outputs from amplitude controller 96 are applied to mixers 92 and 93 respectively, and the positive and negative outputs from amplitude controller 104 are applied to mixers 93 and 92 respectively. The positive and negative outputs from amplitude controller 97 are applied to mixers 90 and 93 respectively, and the positive and negative outputs from amplitude controller 105 are applied to mixers 93 and 90, respectively. The outputs from mixers 90 and 93 are applied to phase shifters 106, 107, 108 and 109 respectively to form output signals Lb2, Lf2, Rf2 and Rb2 which are applied to respective loudspeakers via suitable amplifiers, not shown.

Respective amplitude controllrs 94 to 97 and 102 to 105 have such characteristics that they provide outputs of equal level where the judgment signal is a 1 whereas outputs of zero level where the judgment signal is a 0.

FIG. 13 shows a detailed connection diagram of a portion of decoder matrix circuit 1C and a portion of amplifier controller 95 shown in FIG. 12. For the purpose of forming a control signal Bc1 from reproduced channel signals Lf1 and Rf1 which are reproduced in the decoder matrix circuit 1C, the reproduced channel signals Lf1 and Rf1 are sent to a resistance matrix circuit 110, the output Bc1 thereof being applied to the base electrode of a transistor 111 in the first stage of amplitude controller 95. Since a judgment signal C2 is impressed upon the emitter electrode of transistor 111, signal Bc1 will be subjected to an amplitude control in accordance with the judgment signal C2 to supply output signals of the opposite polarity through the emitter and collector electrodes of transistor 112 in the output stage. These output signals are applied to mixers 91 and 92 respectively.

FIG. 14 shows the detail of one of the phase shifters shown in FIG. 12, for example, phase shifter 107. As shown, the phase shifter 107 comprises two cascade connected transistor stages and the phase angle of the output of mixer 91 is shifted a predetermined angle by these transistor stages to produce an output Lf2. It should be understood that the other amplitude controllers and phase shifters shown in FIG. 12 are constructed as shown in FIGS. 13 and 14.

The circuit shown in FIG. 12 operates as follows:

This circuit is constructed such that where only signals Lf and Rf contain original information and where Lb = Rb = 0, the judgment signal will be C2 = 1, and C1 = C3 = C4 = 0. Under these conditions only amplitude controllers 95 and 105 provide signals and amplitude controllers 94, 102, 103, 96, 104 and 97 do not provide any signal. Then, the outputs Lb2, Lf2, Rf2 and Rb2 of respective mixers 90, 91, 92 and 93 are shown as follows:

$$Lb2 = Lb1 - 0.383Fc1 \tag{53}$$

$$Lf2 = Lf1 - Bc1 \tag{54}$$

$$Rf2 = Rf1 + Bc1 \tag{55}$$

$$Rb2 = Rb1 + 0.383Fc1 \tag{56}$$

When $k = 1$ and $u = 0.383$, equations (53) to (56) satisfy equations (45) to (48), respectively.

Another embodiment of this invention using phase shifters will be described hereunder with reference to FIG. 15.

As shown in FIG. 15, two transmission system signals L and R are impressed upon the input terminals of a decoder matrix circuit 1C for producing reproduced four-channel signals Lb1, Lf1, Rf1 and Rb1 and control signals Fc1, Bc1, Lc1 and Rc1. The reproduced four-channel signals Lb1, Lf1, Rf1 and Rb1 are applied to mixers 115, 116, 117 and 118, respectively, and the control signals Fc1, Bc1, Lc1 and Rc1 are applied to amplitude controllers 119, 120, 121 and 122, respectively. Judgment signals C4, C3, C2 and C1 are also applied to amplitude controllers 119, 120, 121 and 122 respectively for controlling the amplitudes of control signals Rc1, Bc1, Lc1 and Fc1, respectively. The non-inverted output which has the same phase as the input to the amplitude controller 119 is applied to mixers 115 and 116 from the amplitude controller 119. The non-inverted output from amplitude controller 120 is applied to mixer 117, while the inverted output of the amplitude contrller 120 is applied to mixer 116. The non-inverted output and the inverted output of the amplitude controller 121 are applied to mixers 117 and 118, respectively, and the non-inverted and inverted outputs of amplitude controller 122 are applied to mixers 115 and 118, respectively. The outputs Lb2 and Rb2 of respective mixers 115 and 118 are applied to inverters 127 and 128 respectively through resistors 123 and 126, while the outputs Lf2 and Rf2 of mixers 116 and 117 are supplied to non-inverting buffers 129 and 130 respectively through resistors 124 and 125. The outputs of inverters 127 and 128, and non-inverting buffers 129 and 130 are applied to phase shifters 135, 136, 137 and 138 respectively through resistors 131, 132, 133 and 134 for producing output signals Lb3, Lf3, Rf3 and Rb3. A variable resistance element 140 is connected across the juncture between resistor 123 and inverter 127 and the juncture between resistor 126 and inverter 128. A variable resistance element 139 is connected across the juncture between resistor 124 and non-inverting buffer 129 and the juncture between resistor 125 and non-inverting buffer 130. Similarly, variable resistance elements 141 and 142 are connected respectively across the juncture between resistor 131 and phase shifter 135 and the juncture between resistor 132 and phase shifter 136 and across the juncture between resistor 133 and phase shifter 137 and the juncture between resistor 134 and phase shifter 138. Judgment signals C1, C2, C3 and C4 are applied to variable resistance elements 139, 140, 141 and 142, respectively, for the purpose of controlling their resistance values. Let us consider a case wherein the original information is contained in only signals Lf and Rf and Lb = Rb = 0. In this case, the judgment signals are selected such that C2 = 1 and C1 = C3 = C4 = 0. Consequently, only the amplitude controller 120 produces an output whereas the other amplitude controllers 119, 121 and 122 do not produce any output. Under these conditions, the outputs Lb2, Lf2, Rf2 and Rb2 of mixers 115, 116, 117 and 118 are expressed by the following equations.

$$Lb2 = Lb1 \tag{57}$$

$$Lf2 = Lf1 - Bc1 \tag{58}$$

$$Rf2 = Rf1 + Bc1 \tag{59}$$

$$Rb2 = Rb1 \tag{60}$$

Where the judgment signal is 1, the resistance values of the variable resistance elements 139, 140, 141 and 142 will have a sufficiently small value that can be treated as zero when compared with the resistance values of resistors 123 and 126 and resistors 131 and 134 whereas when the judgment signal is 0, the resistance values of the variable resistance elements will become sufficiently high with respect to the resistance value of resistors 123 to 126 and resistors 131 to 134. The variable resistance elements may be composed of photocells or field effect transistors. Under the above described condition, since C2 = 1 and C1 = C3 = C4 = 0, the resistance value of variable resistance element 140 is zero whereas the resistance values of the other variable resistance elements 139, 141 and 142 are sufficiently high. Consequently, the outputs of respective phase shifters 135, 136, 137 and 138 are expressed as follows:

$$Lb3 = Rb3 = \tfrac{1}{2}(Lb2+Rb2) = \tfrac{1}{2}(Lb1+Rb1) \quad (61)$$

$$Lf3 = Lf2 = Lf1 - Bc1 \quad (62)$$

$$Rf3 = Rf2 = Rf1 + Bc1 \quad (63)$$

Expressing signals Lb3 and Rb3 in terms of the components of the original information signals, from equations (37) and (40), we obtain $$Lb3 = Rb3 = \tfrac{1}{2}(Lb1+Rb1) = \tfrac{1}{2}(-1/\sqrt{2}Lf+1/\sqrt{2}Rf) = -0.354Lf + 0.354Rf \quad (64)$$

It can be readily noted that equations (62), (63), and (64) are identical with equations (49), (50), (51) and (52). Although in the foregoing description, it has been assumed that only signals Lf and Rf contain the original information, it can be readily understood that the circuit can operate similarly when signals Rf and Rb or signals Lb and Rb alone contain the original information.

The purpose of providing inverters 127 and 128 is to match the phases of the original information when the variable resistance elements 141 and 142 are operated.

When variable resistance elements are used, where the two-channel signals which are coupled in a short circuited manner have opposite phases, in other words, where the sound source is located on the side opposite to the shorted end of the two-channels, two outputs are added together at opposite phases thus averaging their amplitudes. At the same time as the resistance values of the variable resistance elements are varied, when their values are reduced to zero, or when the variable resistance elements are short circuited the output level will be reduced to one-half (6 dB) thereby improving the separating effect.

As above described, according to this embodiment reproduced four-channel signals Lb1, Lf1, Rf1 and Rb1 are produced from two transmission system signals L and R and control signals Fc1, Bc1, Lc1 and Rc1 are also produced which are located at the middle between respective adjacent channels. Where only signals Lf and Rf contain the original information, and where Lb = Rb = 0, the positive and negative components of the control signal Bc1 are applied to the reproduced four-channel signals Rf1 and Lf1, respectively. The control signal Fc1 is multiplied by a factor of 0.383 by the action of a coefficient multiplier and the positive component of the resulting signal is applied to reproduced four-channel signal Rb1 whereas the negative component is applied to reproduced four-channel signal Lb1. Alternately, firstly the reproduced four-channel information and control signals are formed, and the positive and negative components of the control signal Bc1 are applied to the reproduced four-channel signals Rf1 and Lf1 respectively. Signals Lb1 and Rb1 of the reproduced four-channel information signals are short circuited through a resistor of a definite value so as to eliminate the leak of signals between adjacent channels while at the same time to compensate for the decrease in the acoustic output energy caused by the elimination of the leak, thus assuring high qualities of the reproduced four-channel stereophonic signals.

Further, according to this modification, it is possible to eliminate the leak or cross-talk between adjacent channels while at the same time to compensate for the decrease in the output energy level. Thus, it is possible to simplify the circuit construction because it is not necessary to match the characteristics of the circuit components and can use lesser number of the circuit elements. Further, in the foregoing description, control signals Fc1, Bc1, Lc1 and Rc1 are first formed and thereafter these control signals are applied to the reproduced four-channel signals, but it is possible to completely eliminate the cross-talks between channels and to completely compensate for the output energy level by using a signal A which is located intermediate the signals Lb1 and Bc1, for example, and expressed by an equation $A=xL+yR$ and by selecting suitable values for $x$ and $y$, or by using a signal located intermediate of the signals Rb1 and Bc1.

What we claim is:

1. A four-channel stereophonic sound reproducing system for reproducing four individual audio information signals on four separate loudspeakers adapted to be arranged around a listener, said four individual audio information signals corresponding to four original signals generated from four separate microphones respectively placed at left front, right front, left rear and right rear of the listener, said four original signals being contained in encoded first and second composite signals L and R which are defined by the following equations:

$$L = (Lf+jLb)\cos\theta + (Rf+jRb)\sin\theta$$
$$R = (Rf-jRb)\cos\theta + (Lf-jLb)\sin\theta$$

where Lf=left front, Rf=right front, Lb=left rear and Rb=right rear; said sound reproducing system comprising:

first and second input terminals to which said first and second composite signals L and R are respectively applied;

a decpder matrix circuit connected to said input terminals and combining said first and second composite signals L and R to derive four reproduced signals $Lf_1$, $Rf_1$, $Lb_1$ and $Rb_1$ which are defined by the following equations:

$$Lf_1 = L\cos\theta + R\sin\theta$$
$$Rf_1 = R\cos\theta + L\sin\theta$$
$$Lb_1 = L\cos\theta - \sin\theta$$
$$Rb_1 = R\cos\theta - L\sin\theta$$

a sensor circuit for producing at least one of four judgment signals $C_1$, $C_2$, $C_3$ and $C_4$ as a function of said reproduced signals $Lf_1$, $Rf_1$, $Lb_1$ and $Rb_1$, said sensor circuit having first, second, third and fourth level detectors respectively detecting the level of said four reproduced signals $Lf_1$, $Rf_1$, $Lb_1$ and $Rb_1$; a first mixer connected to receive the outputs of said first and third level detectors for producing a sum of the signal levels of the outputs of said first and third level detectors; a second mixer connected to receive the outputs of said third and fourth level detectors for producing a sum of the signal levels of the outputs of said third and fourth level detectors; a third mixer connected to receive the outputs of said second and fourth level detectors for producing a sum of the signal levels of the outputs of said second and fourth level detectors; a fourth mixer connected to receive the outputs of said first and second level detectors for producing a sum of the signal levels of the outputs of said first and second level detectors; a first level comparator having negative and positive input terminals for respectively receiving the outputs of said first and third mixers at an amplitude ratio of $1/(1+\sqrt{2}):1$ to produce said first judgment signal $C_1$; a second level comparator having positive and negative input terminals for respectively receiving the outputs of said first and third mixers at an amplitude ratio of $1:1/(1+\sqrt{2})$ to produce said second judgment signal $C_2$; a third level comparator having positive and negative input terminals for respectively receiving the outputs of said second and fourth mixers at an amplitude ratio of $1:1/(1+\sqrt{2})$ to produce said third judgment signal $C_3$; and a fourth level comparator having negative and positive input terminals for respectively receiving the outputs of said second and fourth mixers at an amplitude ratio of $1/(1+\sqrt{2}):1$ to produce said fourth judgment signal $C_4$; and a controller circuit for controlling the respective levels of the four reproduced signals $Lf_1$, $Rf_1$, $Lb_1$and $Rb_1$from said decoder matrix circuit in response to the four judgment signals $C_1$ to $C_4$ from said sensor circuit, to provide four audio information signals $Lf_2$, $Rf_2$, $Lb_2$ and $Rb_2$ having decreased cross-talk between adjacent channels.

2. A four-channel sterophonic sound reproducing system according to claim 1 wherein:

said sensor circuit further comprises a fifth level comparator having positive and negative input terminals for respectively receiving the outputs of said second and third level detectors at an amplitude ratio of 1:1 to produce a fifth judgment signal $C_5$; and a sixth level comparator having positive and negative input terminals for respectively receiving the outputs of said forst and fourth level detectors at an amplitude ratio of 1:1 to produce a sixth judgment signal $C_6$; and said controller circuit comprises a first amplitude control signal generator connected to receive said first, fourth and fifth judgment signals for producing a first control signal in response to the lowest level signal of said first, fourth and fifth judgment signals; a second amplitude control signal generator connected to receive said second, fourth and sixth judgment signals for producing a second control signal in response to the lowest level signal of said second, fourth and sixth judgment signals; a third amplitude control signal generator connected to receive said second, third and fifth judgment signals for producing a third control signal in response to the lowest level signal of said second, third and fifth judgment signals; a fourth amplitude control signal generator connected to receive said first, third and sixth judgment signals for producing a fourth control signal in response to the lowest level signal of said first, third and sixth judgment signals; a first amplitude controller coupled to the output of said first amplitude control signal generator and operative to attenuate the level of said reproduced signal $Lf_1$ to substantially zero when the level of said first control signal is lower than a predetermined value and to amplify said reproduced signal $Lf_1$ when the level of said first control signal is higher than said predetermined value so as to obtain the first audio information signal $Lf_2$; a second amplitude controller coupled to the output of said second amplitude control signal generator and operative to attenuate the level of said reproduced signal $Rf_1$ to substantially zero when the level of said second control signal is lower than a predetermined value and to amplify said reproduced signal $Rf_1$ when the level of said second control signal is higher than said predetermined value so as to obtain the second audio information signal $Rf_2$; a third amplitude controller coupled to the output of said third amplitude control signal generator and operative to attenuate the level of said reproduced signal $Lb_1$ to substantially zero when the level of said third control signal is lower than a predetermined value and to amplify said reproduced signal $Lb_1$ when the level of said third control signal is higher than said predetermined value so as to obtain the third audio information signal $Lb_2$; and a fourth amplitude controller coupled to the output of said fourth amplitude control signal generator and operative to attenuate the level of said reproduced signal $Rb_1$ to substantially zero when the level of said fourth control signal is lower than a predetermined value and to amplify said reproduced signal $Rb_1$ when the level of said fourth control signal is higher than said predetermined value so as to obtain the fourth audio information signal $Rb_2$.

3. A four-channel stereophonic sound reproducing system according to claim 1 wherein first and second phase shifters are respectively connected between said first and second input terminals and said decoder matrix circuit, said first phase shifter including four output terminals for obtaining four signals $P_1$, $P_2$, $P_3$ and $P_4$ respectively having phase differences $-\pi/2$, 0, $\pi/2$ and $\pi$ with respect to the first composite signal L; and said second phase shifter including four output terminals for obtaining four signals $Q_1$, $Q_2$, $Q_3$ and $Q_4$ respectively having phase differences $-\pi/2$, 0, $\pi/2$ and $\pi$ with respect to the second composite signal R;

and wherein:

said decoder matrix circuit includes eight input terminals of receiving said respective signals $P_1$ to $P_4$ and $Q_1$ to $Q_4$, and sixteen output terminals for providing sixteen signals Lb1, Lb1j, −Lb1j, −Lb1, Lf1, Lf1j, −Lf1j, −Lf1, Rf1, Rf1j, −Rf1j, −Rf, Rb1, Rb1j, −Rb1j, and −Rb1; and said controller circuit includes a first mixer connected to receive said signals Lf1j and −Rb1; a second mixer connected to receive said signals −Lb1j and −Rf1; a third mixer connected to receive said signals −Lf1 and Rb1j; a fourth mixer connected to receive said signals −Rf1j and −Lb1; a first amplitude controller coupled to the output of said first mixer for controlling the output of said first mixer in response to said judgment signal $C_5$; a second amplitude controller coupled to the output of said second mixer for controlling the output of said second mixer in response to said judgment signal $C_6$; a third amplitude controller coupled to the output of said third mixer for controlling the output of said third mixer in response to said judgment signal $C_5$; a fourth amplitude controller coupled to the output of said fourth mixer for controlling the output of said fourth mixer in response to said judgment signal $C_6$; a fifth amplitude controller for controlling said signal −Lb1j in response to said judgment signal $C_1$; a sixth amplitude controller for controlling said signal −Lf1j in response to said judgment signal $C_4$; a seventh amplitude controller for controlling said signal −Rf1j in response to said judgment signal $C_2$; and eighth amplitude controller for controlling said signal −Rb1j in response to said judgment signal $C_3$; ninth, tenth, eleventh and twelfth amplitude controllers for controlling said signals Lb1j, Lf1j, Rf1j and Rb1j in response to said judgment signals $C_4$, $C_3$, $C_2$ and $C_1$, respectively; a fifth mixer connected to receive said signal Lb1 and the output signals of said first, seventh and eleventh amplitude controllers; a sixth mixer connected to receive said signal Lf1 and the output signals of said second, eighth and twelfth amplitude controllers; a seventh mixer connected to receive said signal Rf1 and the output signals of said third, fifth and ninth amplitude controllers; an eighth mixer connected to receive said signal Rb1 and the output signals of said fourth, sixth and tenth amplitude controllers; a first amplitude control signal generator connected to receive said judgment signals $C_1$ and $C_4$; a second amplitude control signal generator connected to receive said judgment signals $C_2$ and $C_4$; a third amplitude control signal generator connected to receive said judgment signals $C_2$ and $C_3$; a fourth amplitude control signal generator connected to receive said judgment signals $C_1$ and $C_3$; thirteenth, fourteenth, fifteenth and sixteenth amplitude controllers for controlling the output signals of said fifth to eighth mixers in response to the control signals generated from said first to fourth amplitude control signal generators respectively so as to obtain said four audio information signals Lb2, Lf2, Rf2, Rb2.

4. A four-channel stereophonic sound reproducing system according to claim 1 wherein:

said decoder matrix circuit further comprises first, second, third and fourth output terminals for obtaining four control channel information signals Fc1, Bc1, and Rc1 which are expressed by the following equations:

$$Fc1 = 1/\sqrt{2}L + 1/\sqrt{2}R$$
$$Bc1 = -1/\sqrt{2}L + 1/\sqrt{2}R$$
$$Lc1 = L$$
$$Rc1 = R$$

and said controller circuit comprises first, second, third and fourth factor multipliers for multiplying said four signals Fc1 to Rc1 by a factor of 0.383, respectively; first, second, third and fourth amplitude controllers connected to receive said four signals Fc1 to Rc1 to control them in response to said judgment signals $C_1$ to $C_4$, respectively; fifth, sixth seventh and eighth amplitude controllers connected to receive the output signals of said first to fourth factor multipliers to control them in response to judgment signals $C_1$ to $C_4$, respectively; a first mixer connected to receive said signal Lb1 and the output signals of said first, third, sixth and eighth amplitude controllers; a second mixer connected to receive said signal Lf1 and the output signals of said second, third, fifth and eighth amplitude controllers; a third mixer connected to receive said signal Rf1 and the output signals of said second, fourth, fifth and seventh amplitude controllers; a fourth mixer connected to receive said signal Rb1 and the output signal of said first, fourth, sixth and seventh amplitude controllers; and first, second, third and fourth phase shifters for shifting the respective phases of the outputs from said first to fourth mixers to form said output signals Lb2, Lf2, Rf2 and Rb2.

5. A four-channel stereophonic sound reproducing system according to claim 1 wherein:

said decoder matrix circuit further comprises first, second, third and fourth output terminals for obtaining four control channel information signals Fc1, Bc1, Lc1 and Rc1 which are expressed by the following equations:

$$Fc1 = 1/\sqrt{2}L + 1/\sqrt{2}R$$
$$Bc1 = 1/\sqrt{2}L + 1/\sqrt{2}R$$
$$Lc1 = R$$
$$Rc1 = R$$

and said controller circuit comprises first, second, third and fourth amplitude controllers for controlling the amplitudes of said four control channel information signals Fc1 to Rc1 in response to said judgment signals $C_1$ to $C_4$, respectively; a first mixer connected to receive said signal Lb1 and the output signals of said first and fourth amplitude controllers; a second mixer connected to receive said signal Lf1 and the output signals of said second and fourth amplitude controllers; a third mixer connected to receive said signal Rf1 and the output signals of said second and third amplitude controllers; a fourth mixer connected to receive said signal Rb1 and the output signals of said first and third amplitude controllers; first, second, third and fourth resistors having respective input and output terminals, the input terminals of said first, second, third and fourth resistors being respectively coupled to the output terminals of said first to fourth mixers; first and second variable resistors, said first variable resistor being coupled across the output terminals of said second and third resistors and said second variable resistor being coupled across the output terminals of said first and fourth resistors, said first and second variable resistors having respective first and second movable terminals for receiving said respective judgment signals $C_1$ and $C_2$; first and second inverters respectively connected to the output terminals of said first and fourth resistors; first and second buffer circuits respectively connected to the output terminals of said second and third resistors; fifth, sixth, seventh and eighth resistors having respective input and output terminals, the input terminals of said fifth, sixth, seventh and eighth resistors being respectively coupled to the output terminals of said first and second inverters and said first and second buffer circuits; third and fourth variable resistors, said third variable resistor being coupled across the output terminals of said fifth and sixth resistors, and said fourth variable resistor being coupled across the output terminals of said seventh and eighth resistors, said third and fourth variable resistors having respective third and fourth movable terminals for receiving said respective judgment signals $C_3$ and $C_4$; and first, second, third and fourth phase shifters for shifting the respective phases of the outputs obtained from the output terminals of said fifth to eighth resistors to form output signals Lb3, Lf3, Rf3 and Rb3.

6. A four-channel stereophonic sound reproducing system according to claim 1 wherein first and second phase shifters are respectively connected between said first and second input terminals and decoder matrix circuit, said first phase shifter including four output terminals for obtaining four signals $P_1$, $P_2$, $P_3$ and $P_4$ respectively having phase differences $-\pi/2$, 0, $\pi/2$ and $\pi$ with respect to the first composite signal L; and said second phase shifter including four output terminals for obtaining four signals $Q_1$, $Q_2$, $Q_3$ and $Q_4$ respectively having phase differences $-\pi/2$, 0, $\pi/2$ and $\pi$ with respect to the second composite signal R;

and wherein:

said decoder matrix circuit includes eight input terminals for receiving said respective signals $P_1$ to $P_4$ and $Q_1$ to $Q_4$, and eight output terminals for providing eight signals Lb1, Lb1j, –Lb1j, Lf1, Rf1, Rb1, –Rb1j and Rb1j;

said sensor circuit further includes fifth and sixth level detectors for detecting the levels of said respective signals Lb1j and –Rb1j; and a fifth mixer having first and second negative input terminals for respectively receiving the output signals of said fifth and sixth level detectors and having first and second positive input terminals for respectively receiving the output signals of said first and second level detectors, the amplitude ratio between the output signal of the fifth or sixth level detector and that of the first or second level detector being set at $1:1/(1+\sqrt{2})$ so as to obtain a single judgment signal C corresponding to said first judgment signal $C_1$; and said controller circuit comprises a first amplitude controller connected to receive said signal –Lb1j and said judgment signal C; a second amplitude controller connected to receive said signal Rb1j and said judgment signal C; a third amplitude controller connected to receive said signal Lb1 and said judgment signal C and to generate said third audio information signal Lb2; a fourth amplitude controller connected to receive said signal Rb1 and said judgment signal C and to generate said fourth audio information signal Rb2; a sixth mixer connected to receive said signal Lf1 and the output signal of said second amplitude controller and to generate said first audio information signal Lf2; and a seventh mixer connected to receive said signal Rf1 and the output signal of said first amplitude controller and to generate said second audio information signal Rf2.

7. A four-channel stereophonic sound reproducing system according to claim 1 wherein:

said sensor circuit further includes a fifth mixer having first and second positive input terminals and third and fourth negative input terminals for respectively receiving the output signals of said first to fourth level detectors, the amplitude ratio between the output signal of the third or fourth level detector and that of the first or second level detector being set at $1:1/(1+\sqrt{2})$ so as to obtain a signal judgment signal C corresponding to said first judgment signal $C_1$; and said controller circuit includes a first amplitude controller for controlling the amplitude of the signal Lf1 in response to the judgment signal C; a second amplitude controller for controlling the amplitude of the signal Rf1 in response to the judement signal C; a sixth mixer having positive and negative input terminals for mixing the signal Lf1 and the output signal of the second amplitude controller at an amplitude ratio of $1:1/\sqrt{2}$; a seventh mixer having positive and negative input terminals for mixing the signal Rf1 and the output signal of the first amplitude controller at an amplitude ratio of $1:1/\sqrt{2}$; third, fourth, fifth and sixth amplitude controllers for respectively controlling the amplitudes of the output signals of said sixth and seventh mixers and of the signals Lb1 and Rb1 in response to said judgment signal C so as to obtain said first through fourth audio information sigals Lf2, Rf2, Lb2 and Rb2.

* * * * *

UNITED STATES PATENT OFFICE
CERTIFICATE OF CORRECTION

PATENT NO. : 3,864,516
DATED : February 4, 1975
INVENTOR(S) : Akio KAMEOKA, et al It is certified that error appears in the above-identified patent and that said Letters Patent are hereby corrected as shown below:

Column 19, line 42, after "outputs of said" change "forst" to --first--;

Column 22, line 22, change "Lc1 = R" to --Lc1 = L--.

Signed and sealed this 29th day of April 1975.

(SEAL)
Attest:

RUTH C. MASON
Attesting Officer

C. MARSHALL DANN
Commissioner of Patents
and Trademarks